Feb. 24, 1959     K. R. WENDT ET AL     2,875,270
SUBSCRIPTION-TELEVISION SYSTEM
Filed June 7, 1955     15-Sheets-Sheet 2
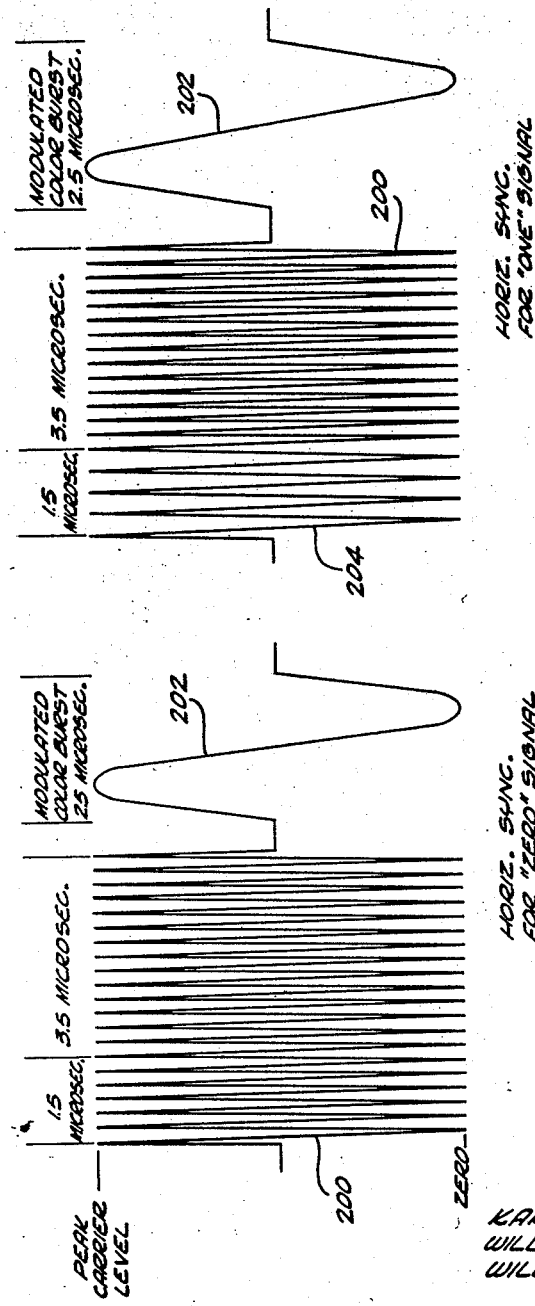
KARL R. WENDT
WILLIAM K. SQUIRES
WILLIAM F. GUNNING
INVENTORS
BY *Lyon & Lyon*
ATTORNEYS Feb. 24, 1959     K. R. WENDT ET AL     2,875,270
SUBSCRIPTION-TELEVISION SYSTEM
Filed June 7, 1955     15 Sheets-Sheet 3
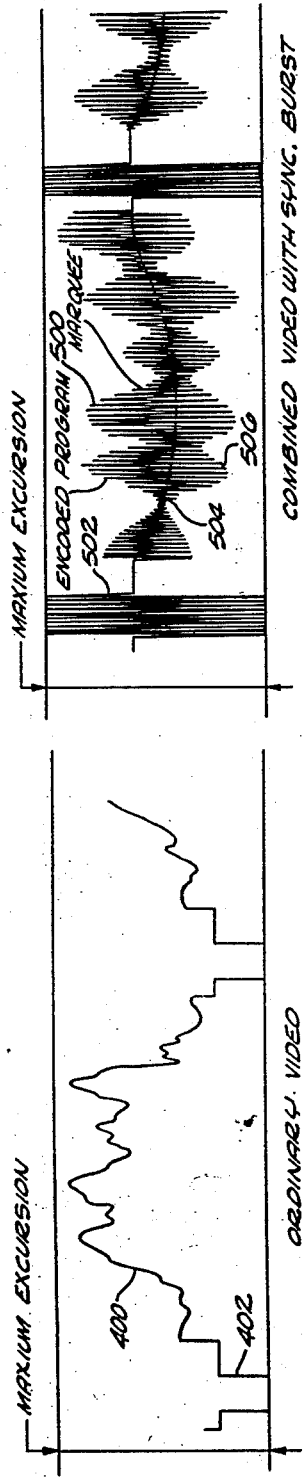
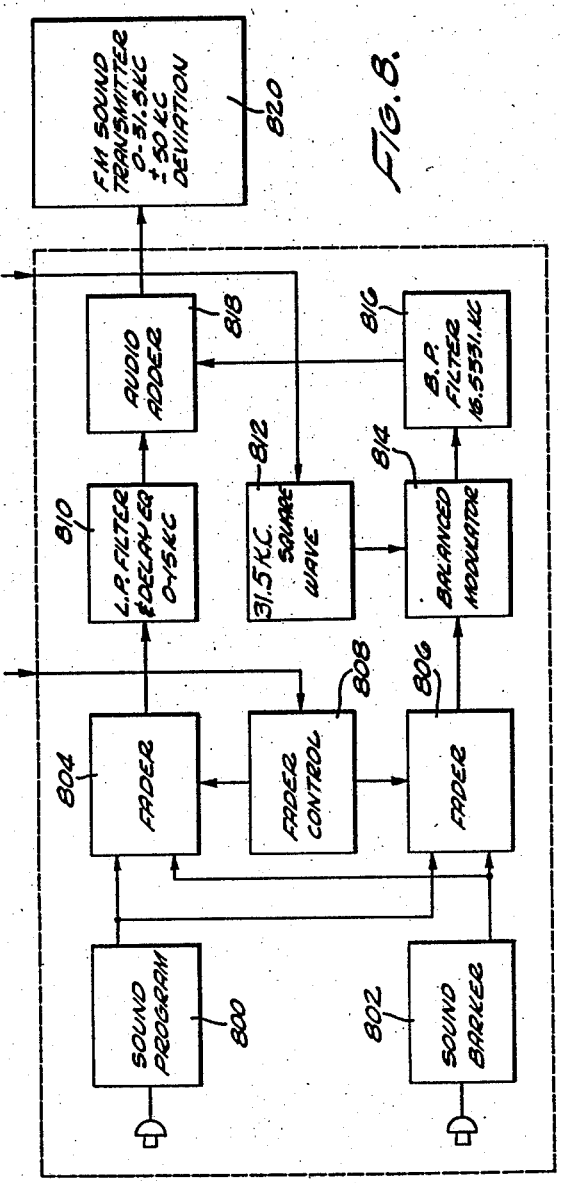
KARL R. WENDT
WILLIAM K. SQUIRES
WILLIAM F. GUNNING
INVENTORS
BY
ATTORNEYS

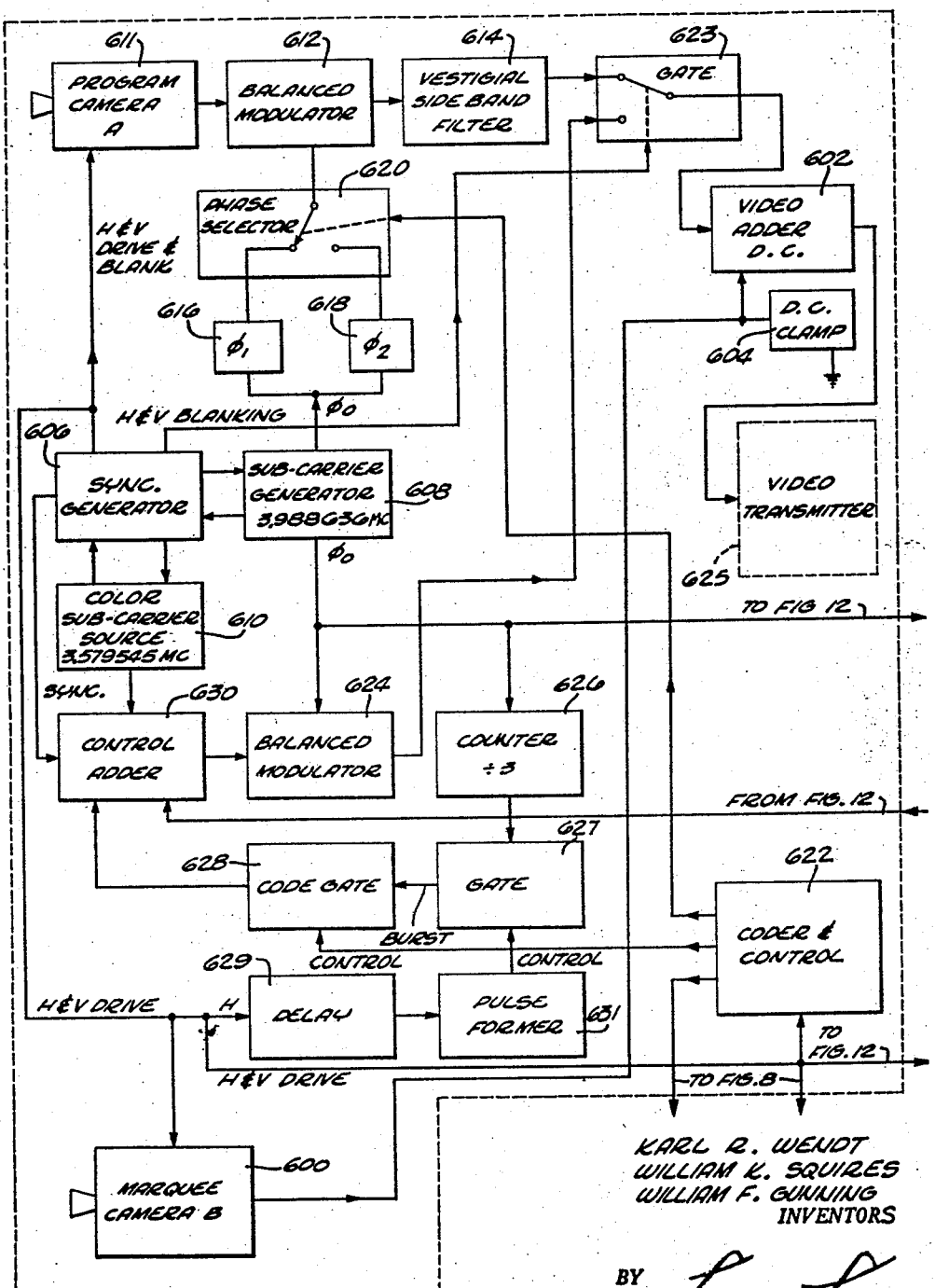

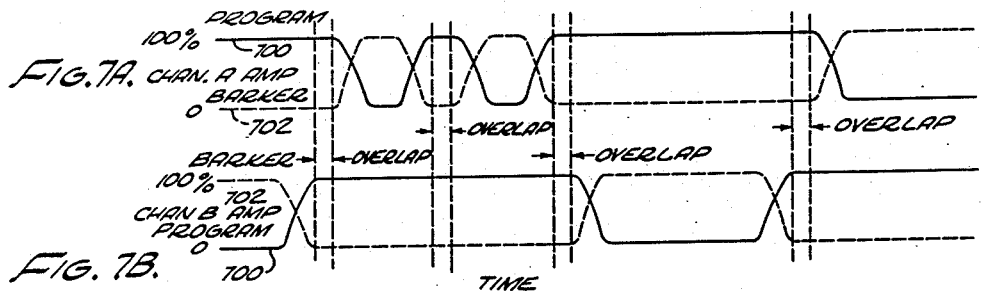
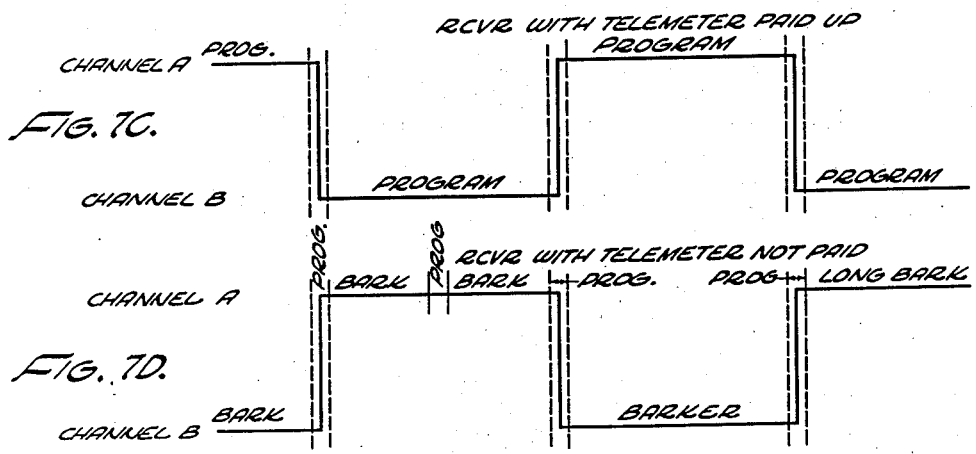
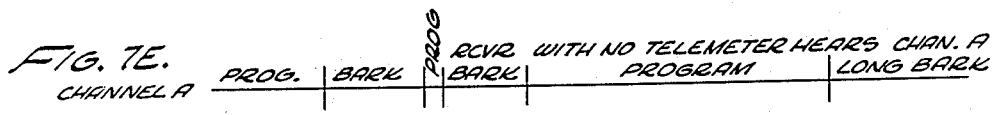
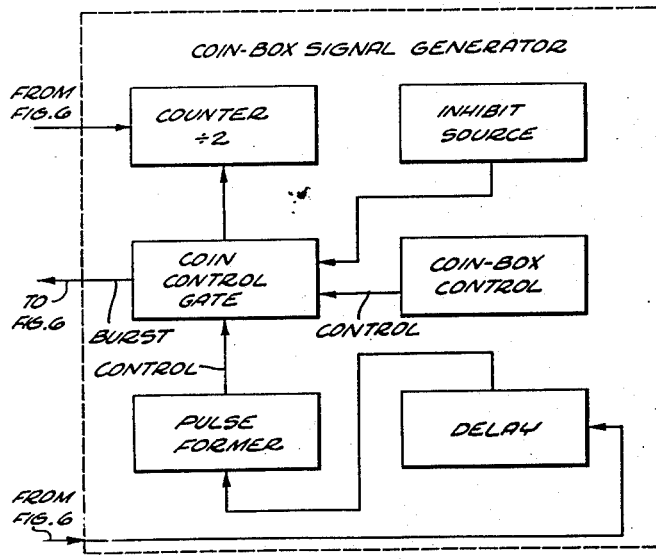
KARL R. WENDT
WILLIAM K. SQUIRES
WILLIAM F. GUNNING
INVENTORS

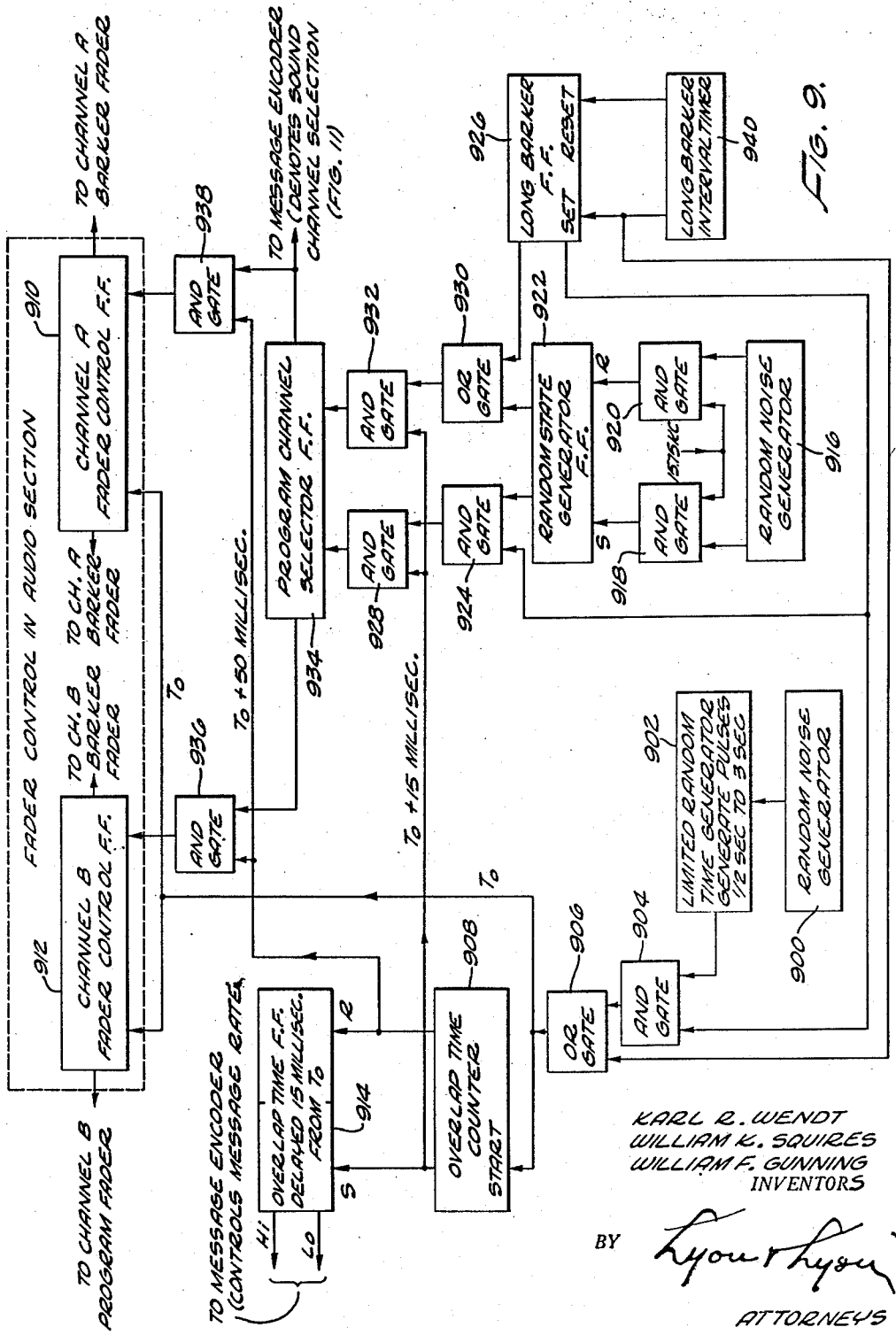

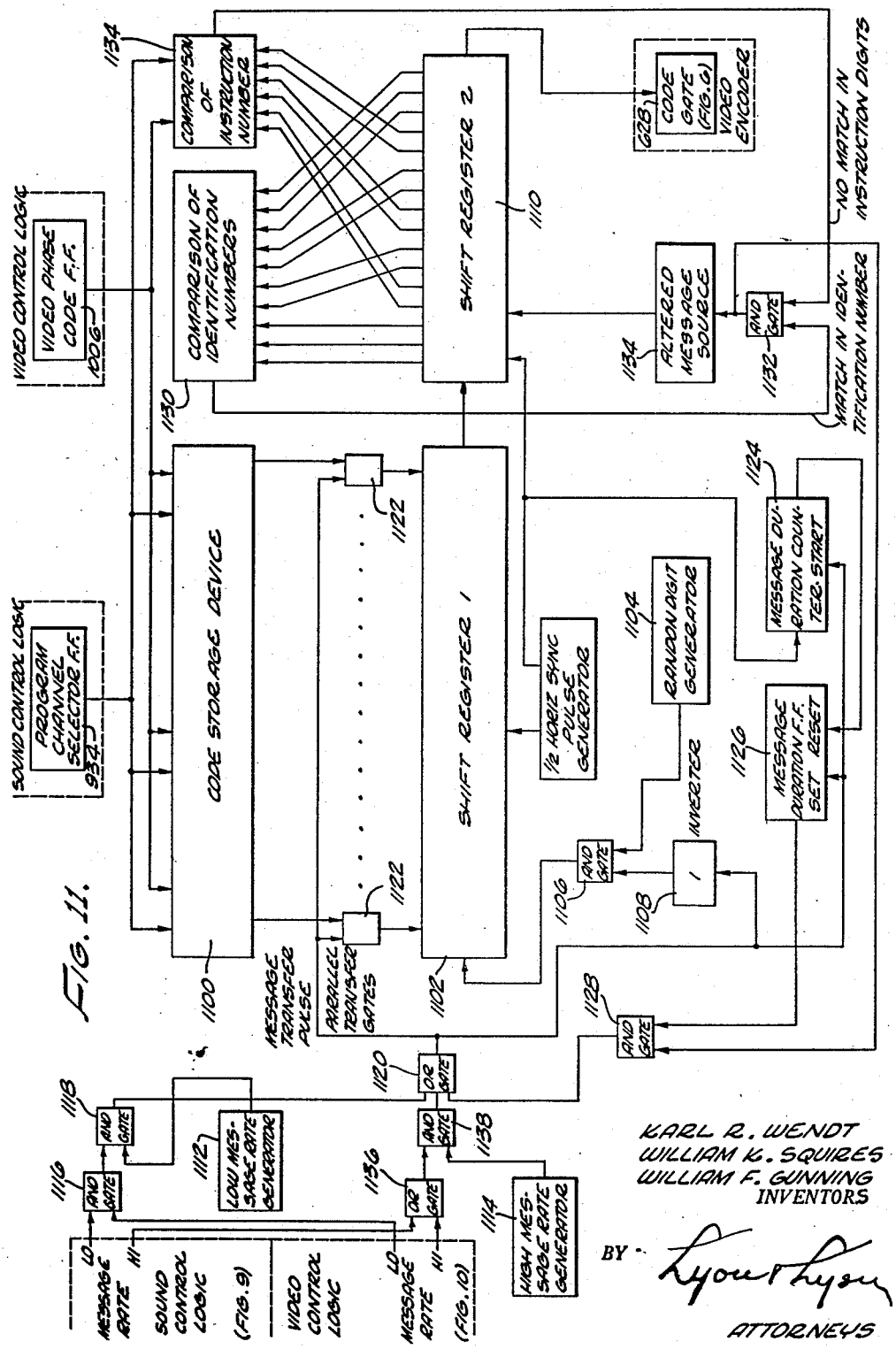

Feb. 24, 1959     K. R. WENDT ET AL     2,875,270
SUBSCRIPTION-TELEVISION SYSTEM
Filed June 7, 1955     15 Sheets-Sheet 9
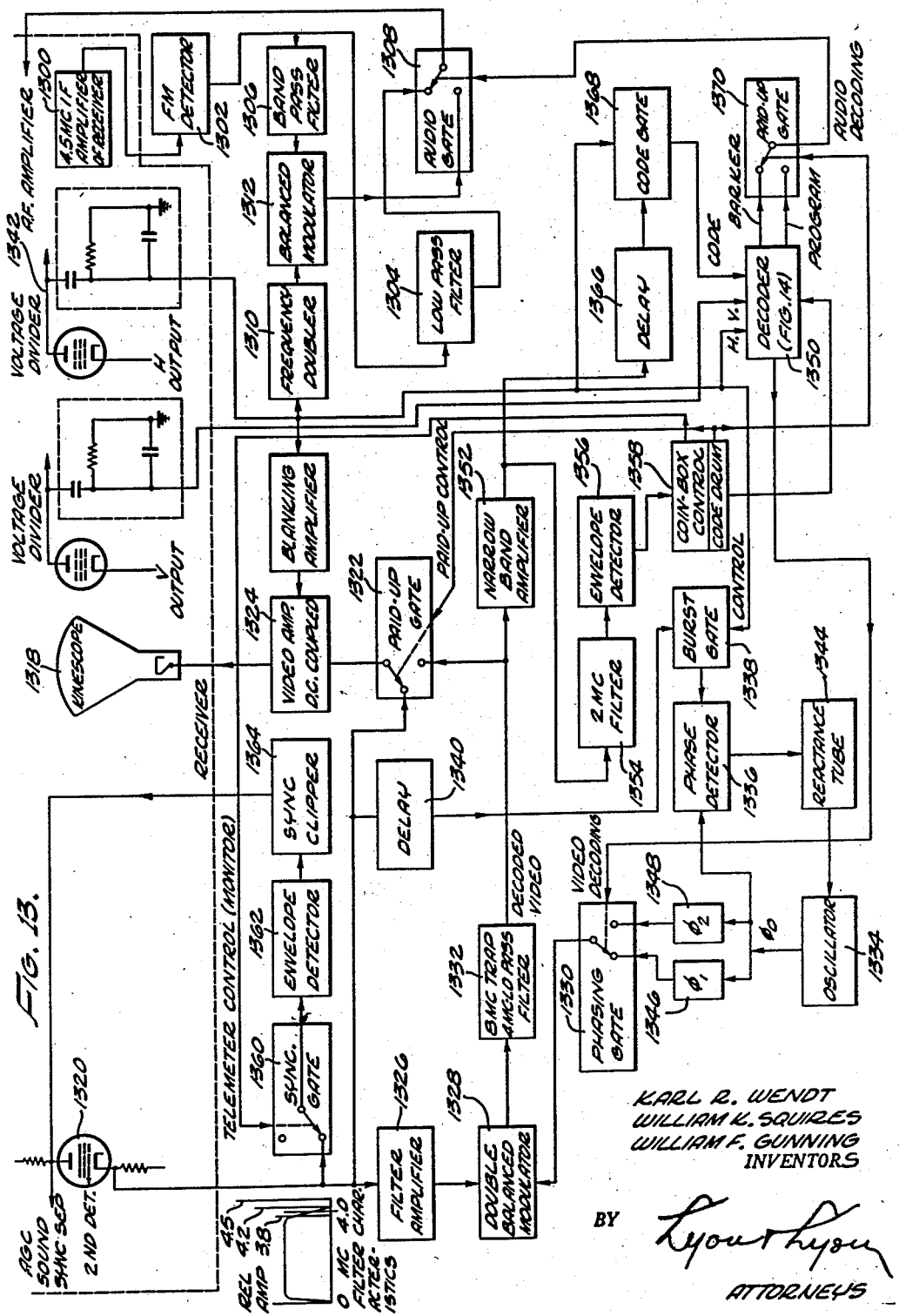
KARL R. WENDT
WILLIAM K. SQUIRES
WILLIAM F. GUNNING
INVENTORS
BY *Lyon & Lyon*
ATTORNEYS

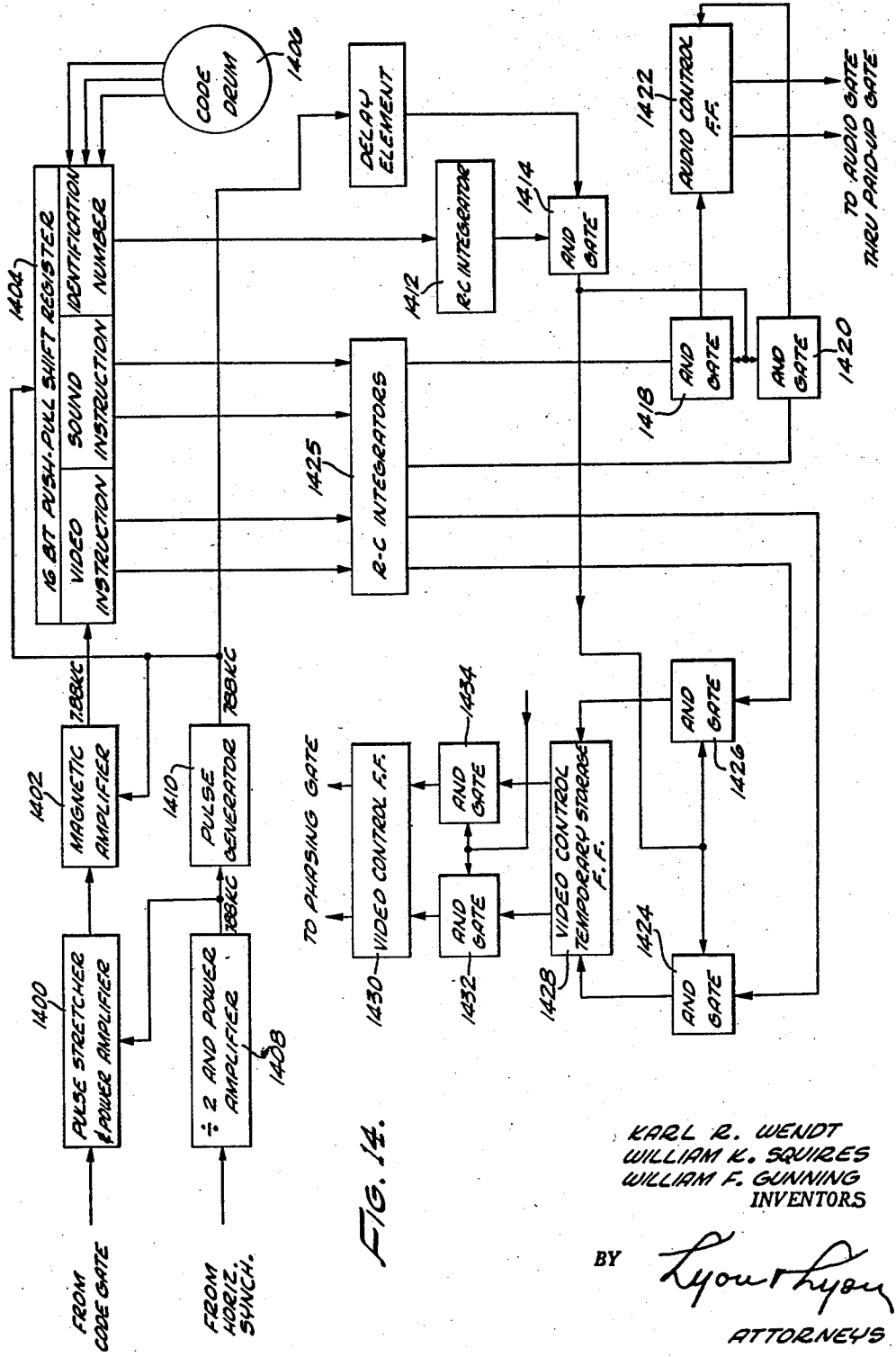

Feb. 24, 1959 K. R. WENDT ET AL 2,875,270
SUBSCRIPTION-TELEVISION SYSTEM
Filed June 7, 1955 15 Sheets-Sheet 12

KARL R. WENDT
WILLIAM K. SQUIRES
WILLIAM F. GUNNING
INVENTORS

BY Lyon + Lyon

ATTORNEYS

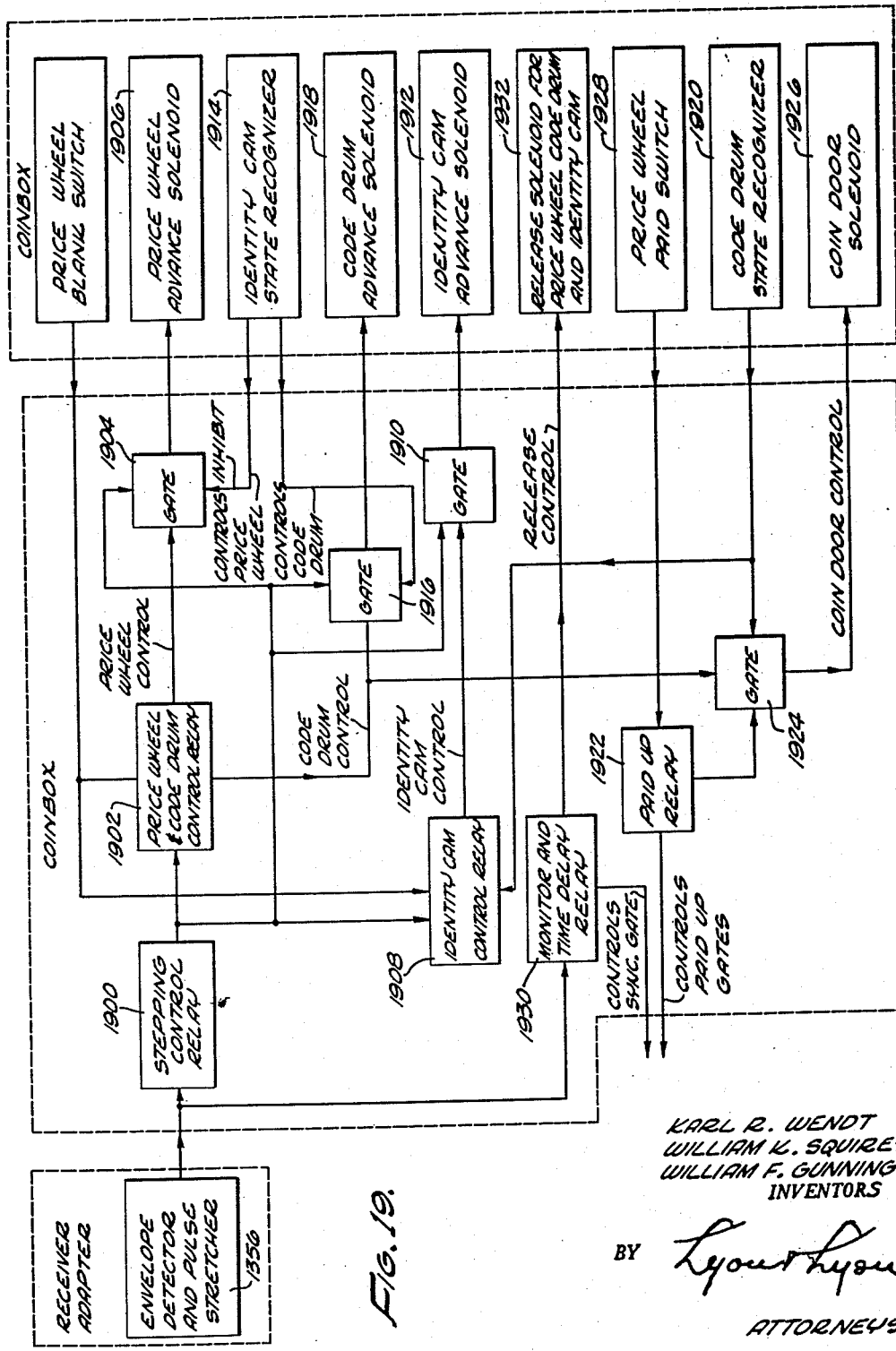

United States Patent Office 2,875,270
Patented Feb. 24, 1959

2,875,270

SUBSCRIPTION-TELEVISION SYSTEM

Karl R. Wendt, Buffalo, and William K. Squires, Snyder, N. Y., and William F. Gunning, Venice, Calif., assignors to International Telemeter Corporation, Los Angeles, Calif., a corporation of Delaware Application June 7, 1955, Serial No. 513,637

26 Claims. (Cl. 178—5.1)

In an application by David L. Loew, Carl Leserman, Lorenzo del Riccio, and Robert E. Gottfried, filed January 19, 1950, Serial No. 139,358, and issued October 30, 1956 as Patent No. 2,769,023, for a Prepaid Entertainment Distribution System, assigned to this assignee, there is described and claimed a subscription television system. This is a television entertainment distribution system wherein, in advance of viewing special television entertainment, a payment must be made. To insure such payment, a television transmitter transmits program video which has been rendered unintelligible. Also transmitted are signals which are designated as coin-demand signals. These are signals representative of the price which must be paid by a subscriber to the subscription television system in order to render intelligible the unintelligible video signals. At the receiver of the subscriber to the system there is a coinbox which has equipment capable of being operated in response to the coin-demand signals to indicate such coin demand to the subscriber. The subscriber, if he desires to see the program, satisfies the coin demand by depositing the coinage requested in the coinbox. As a result, apparatus at the receiver is enabled to permit the unintelligible video to become intelligible, and the program may then be viewed. Also provided at the subscriber receiver is a mechanism for recording pertinent data in connection with a program which has been purchased by the subscriber. Signals for such recording are also transmitted, and, upon the coin demand being satisfied, the recorder is actuated to record these signals.

In applications to Robert E. Gottfried and Allen D. Hoffman, for Subscription Television System Using Land Line, filed December 1, 1951, Serial No. 259,436, and issued July 15, 1958 as Patent No. 2,843,654, and to Robert E. Gottfried, Allen D. Hoffman, and Louis N. Ridenour, for Subscription Television with Scrambled Transmission and Marquee and Barker, filed December 3, 1951, Serial No. 259,636, and issued July 15, 1958 as Patent No. 2,843,655, both assigned to this assignee, there are described further innovations in a subscription television system, amongst which are the transmission of a marquee and a barker. The marquee comprises video signals which perform the function of a theater marquee, namely, to set forth the name of the program and its virtues and whatever other feasible data is desired to be shown. This marquee video is seen by the subscriber before he has paid for the program and is replaced by program after such payment. The barker comprises audio signals which are transmitted for the purpose of orally advising the owner of a receiver of the virtues of the program to be shown and any other pertinent data desired. This, too, is heard before payment and is replaced by program sound after payment.

An object of the present invention is to provide a novel and improved subscription television system.

Yet another object of the present invention is the provision of a subscription television system wherein marquee and barker may be seen and heard by nonsubscriber receivers, as well as subscriber receivers.

Still another object of the present invention is the provision of an improved subscription television system wherein marquee video, program video, barker and program sound, all required decoding signals, as well as coin-demand and recording signals, are all transmitted within the bandwidth limits established by the Federal Communication Commission.

A further object of the present invention is the provision of a novel subscription television system wherein color-television transmission may also be made.

Still another object of the present invention is the provision of a novel arrangement for transmitting coded information within a television transmission.

These and other objects of the present invention are achieved in a system wherein the program video and the marquee video are transmitted employing the techniques of frequency interleaving, such as are presently employed in transmitting brightness and chromanance signals within a single frequency spectrum in a color-television transmission system. The marquee video is transmitted in the manner for transmitting brightness information, and the program video is frequency interleaved therewith. However, in addition, the program video is coded or rendered unintelligible by being modulated on one or the other of two out-of-phase subcarriers which are derived from a reference-phase subcarrier whose frequency is selected to permit the interleaving to be achieved. The modulated signals are then passed through a filter network which passes the lower sideband and a vestige of the upper sideband. The filter output is then mixed with the marquee video, resulting in frequency interleaving.

The modulation of the program video on a first or second phase of the subcarrier is under the control of a coder, which generates coded video-switching signals at random intervals. Thus, the program video is interleaved and coded. The video-switching code is transmitted within the interval of horizontal synchronizing pulses. Further, to maintain proper phase relationships at the receiver, reference-phase subcarrier frequency is also transmitted within the interval of horizontal synchronizing pulses. A receiver will receive and display the marquee video, but program will not be visible, since, due to the integration effects of the eye, a cancellation of program video is achieved. The interleaving process is described in an article entitled "Frequency Interleaving, in the NTSC Standards," by I. C. Abrahams, in the Proceedings of the IRE for January 1954, volume 42, No. 1, page 81. Also, an indication of the extent of the work done in the field is shown in the bibliography accompanying this article.

The transmitter also generates barker audio signals and program audio signals. These signals are handled and transmitted in a manner which has been described and claimed in an application for a Secrecy System, by Phil H. Weiss, filed April 18, 1955, Serial No. 501,840, and assigned to this assignee. In accordance therewith, two audio channels are employed with barker audio and program audio being aperiodically interchanged on these channels. Audio-switching signals are generated at the times of interchange. A receiver, which belongs to a subscriber who has not yet purchased the program being transmitted will receive the audio-switching signals, but its audio system will follow the barker audio as it is switched between the channels. The receiver of a subscriber who has paid for the program employs these same switching signals to follow the program audio as it is being switched between channels. A nonsubscriber receiver will hear an unintelligible mixture of the two signals. However, at intervals a barker will be heard for a time. Coin-demand signals and recording signals are generated as frequency bursts and are transmitted during the vertical-retrace intervals. The coded video- and audio-switching signals are transmitted during the horizontal synchronizing interval.

At each subscriber receiver, a subcarrier is generated having the same frequency as was employed at the transmitter. Its frequency and phase are stabilized using the reference-phase subcarrier bursts being received during the horizontal synchronizing intervals. The two out-of-phase subcarriers are derived from the generated subcarrier. A coinbox receives the coin-demand pulses and the recording pulses and establishes a coin demand. Marquee video is seen and barker audio is heard. However, satisfaction of the coin demand by the subscriber enables the viewing of the program video, which is demodulated with the proper phase of the subcarrier selected in accordance with the video code received. Further, the audio system now follows the program audio instead of the barker audio.

The marquee video, by reason of the subcarrier being applied for program demodulation to the video signal, is shifted to the position previously occupied by the program video. Such shift acts to render the marquee invisible for the same reasons as program video was not seen prior to coin-demand satisfaction. Further, recording mechanism at the receiver is also enabled, and a recording indicative of the program purchased is made.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 2 and 3 are wave shape diagrams showing how code signals may be transmitted within the horizontal synchronizing-signal interval;

Figure 10:
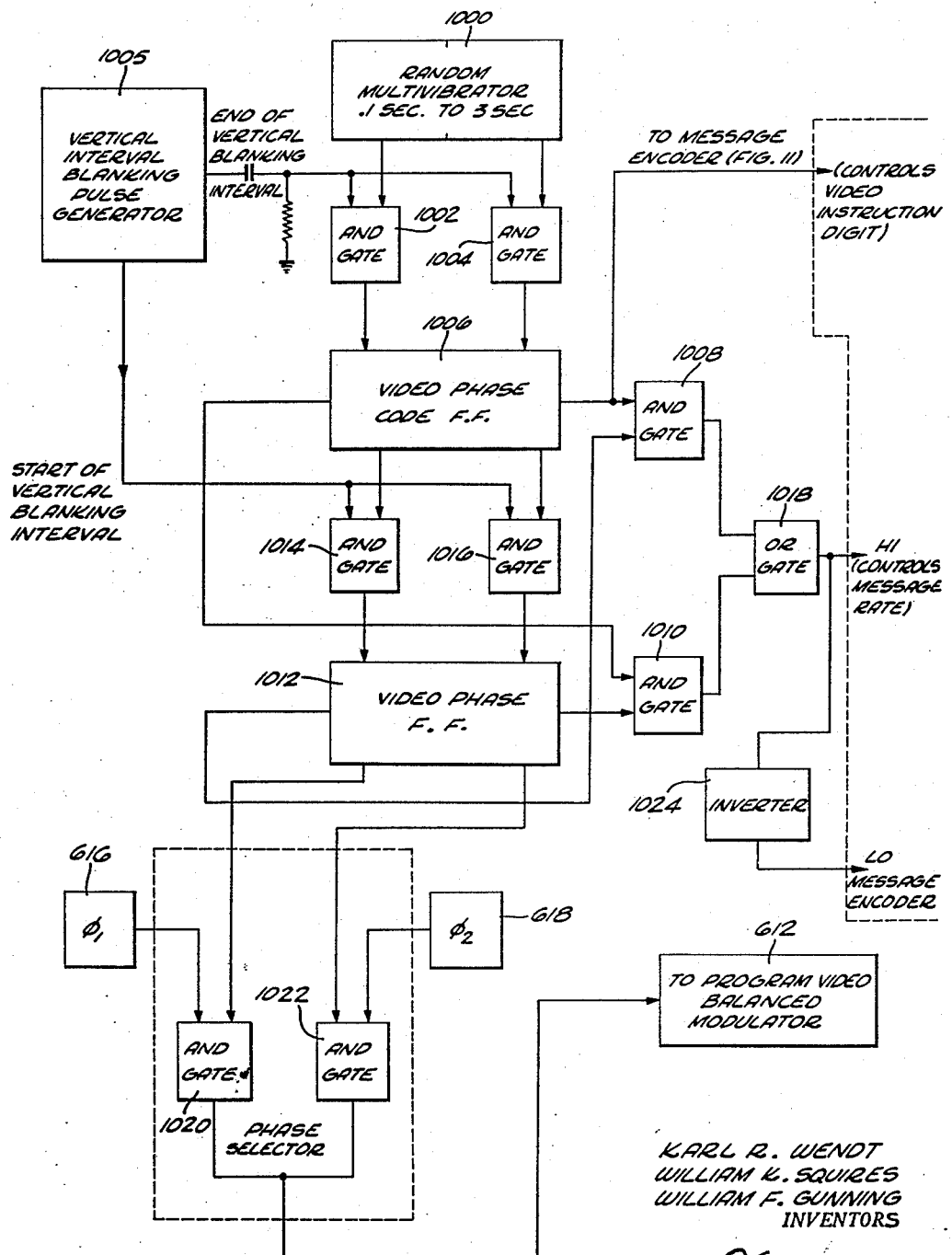
Figure 15:
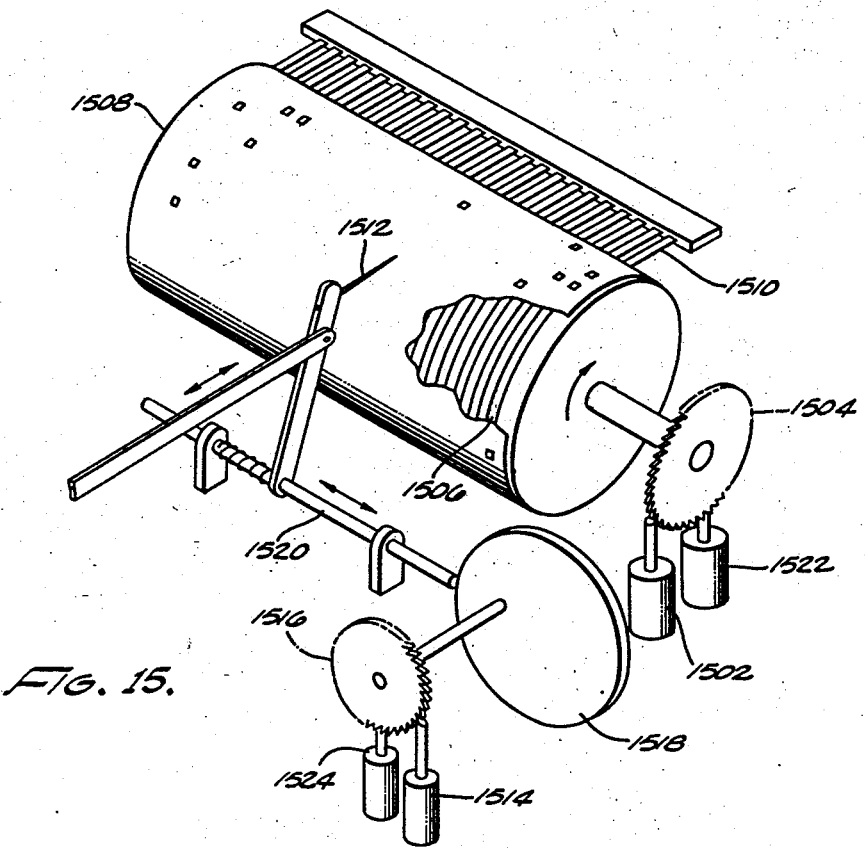
Figure 16:
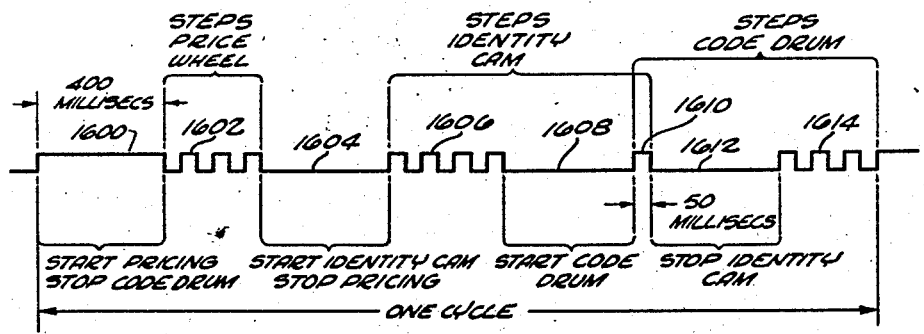
Figure 17:
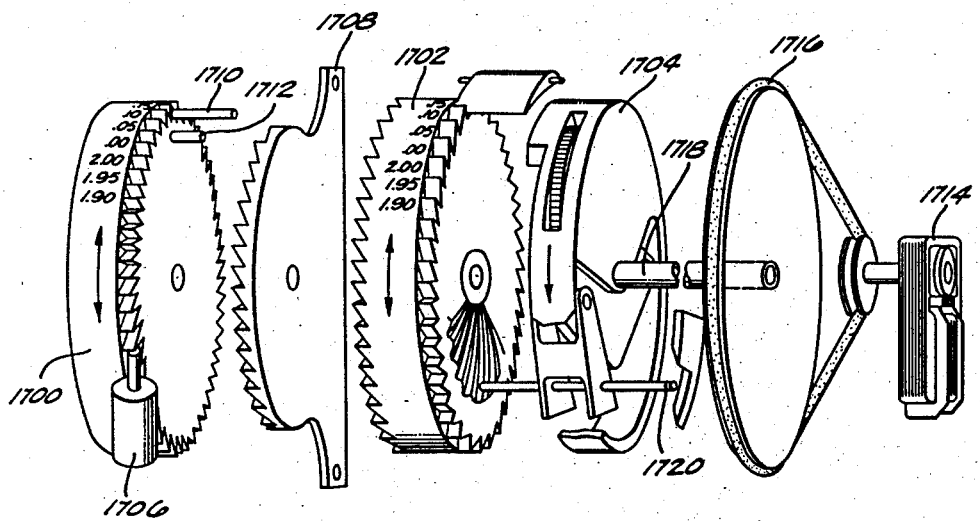
Figure 18:
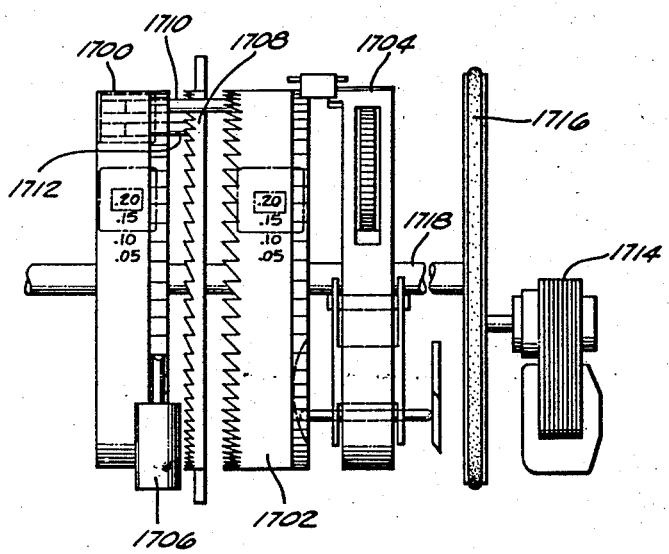

Figures 4 and 5 respectively show the usual composite video wave shape and the composite video wave shape derived in employing the present invention;

Figure 6 is a block diagram of a transmitter in accordance with this invention;

Figures 7A, 7B, 7C, 7D and 7E show waveforms to assist in an understanding of the audio-scrambling portion of the transmitter;

Figure 8 is a block diagram of the audio-scrambling system used at the transmitter;

Figure 9 is a block diagram of the sound-control arrangement portion of the coder and control circuits;

Figure 10 is a block diagram of the video-control arrangement portion of the coder and control circuits;

Figure 11 is a block diagram of the message-encoder arrangement portion of the coder and control circuits;

Figure 12 is a block diagram of a coinbox signal generator at a transmitter;

Figure 13 is a block diagram of the apparatus required at a receiver to enable it to function in the subscription-television system which is an embodiment of this invention;

Figure 14 is a block diagram of the decoding unit employed at the receiver;

Figure 15 is a perspective of the code-drum and program-identification mechanism;

Figure 16 shows wave shapes as reconstituted at a receiver, for a typical sequence of coinbox operations;

Figures 17 and 18 are respectively an exploded view and a plan view of the coin-receiving mechanism;

Figure 19 is a block diagram of the receiver coinbox-control logic; and

Figure 20A:
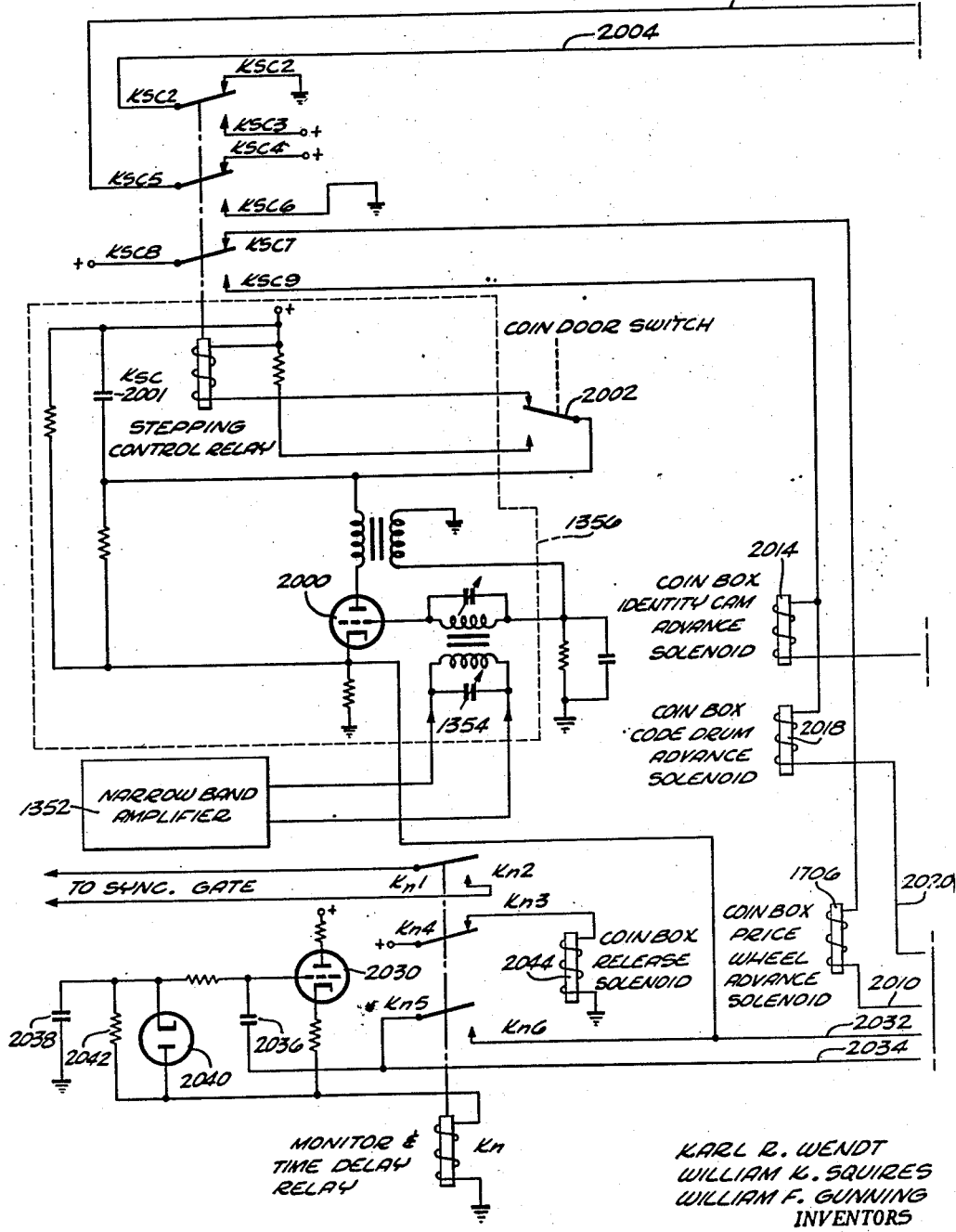

Figures 20A and 30B are circuit diagrams of the relay and switch arrangements which are embodied in the block diagram arrangement of Figure 19.

Video and coding principles

P. Mertz and F. Gray, in an article entitled "A Theory of Scanning and its Relation to the Characteristics of the Transmitted Signal in Telephotography and Television," in the Bell System Technical Journal, vol. 13, p. 464, July 1934, pointed out that the energy of a television signal is concentrated at spaced points in the video-frequency spectrum. The gaps in between may be employed to send further information. Thus, if there are two television systems whose scanning rates are synchronized, the spectral lines of one can be interleaved with those of the other. Such interleaving is achieved, in a color-television system for example, by moving the frequency of one of the television signals with respect to the other by an amount corresponding to some odd multiple of one-half the line and frame rate. This may be accomplished by modulating one of the signals with a subcarrier having a frequency of this value; then both signals are mixed and then transmitted. With proper previous regard of the relative video-signal amplitudes having been taken, such signals may be received and separated with a minimal of interference with each other. At a receiver, the signal which is modulated on the carrier is not seen, since the sinusoidal brightness variations which occur during corresponding lines of successive frames displayed on the cathode-ray tube are 180° out of phase with each other. Hence, due to the persistence of vision of the human eye, there is a tendency for the brightness variations on successive frames to cancel each other. This has been termed physiological filtering.

In the subscription television system comprising the present invention, such frequency interleaving is employed. The marquee video signals are transmitted as a conventional television signal. The program video is amplitude modulated upon a subcarrier whose frequency is suitably selected. Utilizing a filter network, the lower sideband is passed through and the upper sideband is vestigally suppressed, so that the modulated signals contain harmonic components within conventional frequency limits. In the embodiment of the present invention, the subcarrier frequency is chosen to be the highest odd multiple of half the line and frame frequencies compatible with the band restrictions of conventional transmission and the location of the chromanance and audio subcarriers. The frequency chosen is nominally 3.998636 mc., which is only one of the several possibilities which might be used. This frequency provides minimum interference with the subcarrier frequency used for color broadcasts.

In transmission of color, the chromanance signals are modulated by a subcarrier. This shifts the chromanance information to the lower end of the channel frequencies which are normally visible and which would be used by the marquee. The effect of the marquee on the color values will be generally distributed over the picture. In color transmission, the low-frequency components of the marquee will be reduced in energy. However, since the chromnance signals are limited to 2 mc., the high-frequency components of the marquee which has components between 2 and 4 mc. may be sent freely. This restriction on the frequency composition of the marquee does not seriously impair its usefulness.

Thus far, employing the interleaving techniques, all that a nonpaid or nonsubscriber receiver would require to view the program would be to generate a suitable subcarrier. To render the system secure against such eventuality, a video-security system is employed.

Figure 1:
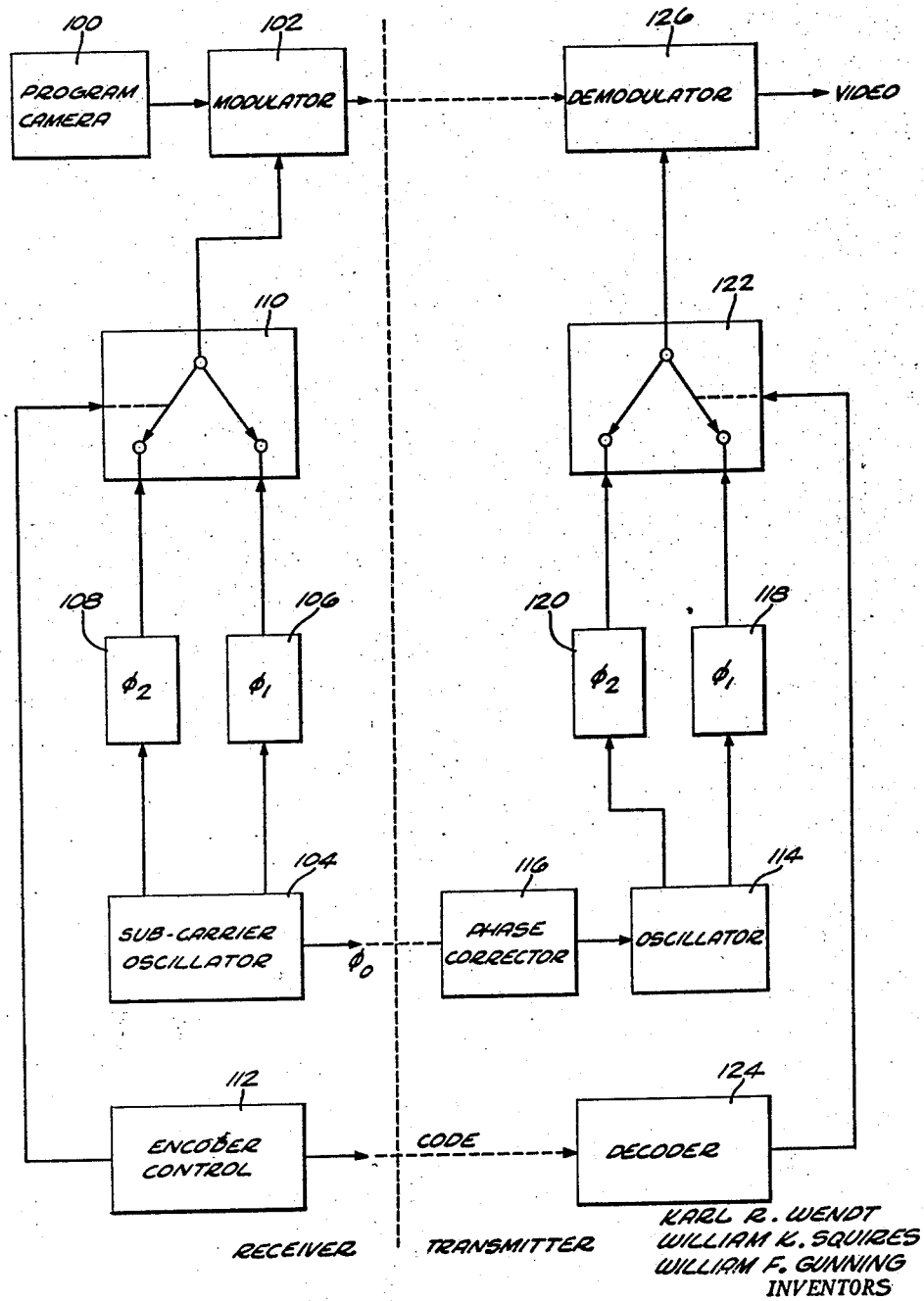
Figure 1 is a simplified block diagram of the video security system employed in the embodiment of the invention.

Figure 1 is a simplified block diagram of the video-security system which is embodied in this invention. The program-video signals are generated by a program camera 100. This camera is the well-known and commercially purchasable television camera. The output of the camera, comprising program-video signals, is applied to a modulator 102. As previously indicated, the subcarrier frequency is selected as nominally 3.998636 mc. This is generated by an oscillator 104 in phase which may be termed $\phi_0$. The output of the subcarrier oscillator is applied to two different phase-shift networks 106, 108, which are respectively designated as $\phi_1$, $\phi_2$. These phase-shift networks respectively shift the phase of the subcarrier oscillator a different amount. It is preferred that the relative phase difference between $\phi_1$, $\phi_2$ be 180°, since this will cause phase reversal of the picture seen by an unauthorized receiver in which the subcarrier may be generated. Thus, the picture is made substantially unintelligible. The outputs from the two phase shifters are applied to a switching device 110. This is represented as a single-pole double-throw switch. Its electronic equivalents are well known and may comprise, for example, a pair of gating tubes, one or the other of which is enabled to transmit a phase-shifted subcarrier in response to the output of an encoder 112. The encoder generates a switching and coding signal. Accordingly, the video signals from the camera 100 will be modulated by phase 1 or phase 2 of the subcarrier in accordance with the output of the encoder.

A receiver, for the purpose of demodulating the coded video, requires an oscillator 114 which generates a subcarrier which is in phase with the subcarrier generated at the transmitter. To achieve this, subcarrier oscillations are transmitted. They are compared with the oscillations generated at the receiver by a phase corrector 116, which suitably controls the oscillator 114 to eliminate any differences. The output of the oscillator is applied to two phase shifters 118, 120, respectively designated as $\phi_1$ and $\phi_2$, since these are passive phase-shift networks which are identical to those employed in the transmitter. The outputs of the phase shifters are applied to a switching device 122, which also may be identical with the switching device 110 in the transmitter. The switching device is under the control of a decoder 124, which receives the signals generated at the encoder and operates the switching device to provide at the demodulator 126 subcarrier oscillations whose phase is identical with the subcarrier oscillations used to modulate the video signal. The output of the demodulator may then be suitably applied to the viewing apparatus of a television receiver.

From the above, it will be seen that it is necessary to transmit the reference-phase sub-carrier oscillations plus the signals from the encoder, which can be designated as code signals, in order to enable a receiver to decode the program video. A nonsubscriber receiver is not equipped with apparatus to receive either of these signals. Obtention of subcarrier oscillations does not afford a usable picture, in view of the random changes between the different phase subcarriers used for modulation. Accordingly, it is believed that the arrangement for transmitting the program video is a novel security system.

The subcarrier oscillations required for a receiver are transmitted as frequency bursts during the interval of a horizontal-synchronizing pulse. As a matter of fact, instead of a horizontal-synchronizing pulse being transmitted, unmodulated uniform-amplitude subcarrier oscillations are transmitted. The receiver detects the overall envelope of each of these subcarrier oscillation bursts. This is used identically with the horizontal-synchronizing pulse normally transmitted. As a matter of fact, better horizontal synchronization can be obtained since more information is available from the subcarrier burst than from the usual synchronizing pulse.

The horizontal-synchronizing-pulse interval is also used for transmitting code pulses. Considering Figure 2, there is shown a wave shape of the subcarrier burst, which is transmitted within the horizontal-synchronizing-pulse interval from which a horizontal-synchronizing signal is derived. This comprises a nominally 5-microsecond transmission of unmodulated subcarrier oscillations 200 at peak-carrier amplitude. Following this, there is a blanking interval known in black-and-white television as the backporch of the horizontal-synchronizing pulse. A color burst 202 may be transmitted during this interval in an encoded manner, if the transmission is to be made in color.

Figure 3 shows wave shapes to afford an understanding of how the horizontal-synchronizing-pulse interval is employed for transmitting code data. The first one and one-half microseconds nominally of the horizontal-synchronizing-pulse interval may be employed for transmitting either subcarrier oscillations 200 or oscillations 204 at two-thirds of the frequency of the subcarrier. As shown in Figure 3, the first one and one-half microseconds of the horizontal-synchronizing interval contains two-thirds of the oscillations contained in the first one and one-half microseconds of the horizontal-synchronizing pulse shown in Figure 2. The last three and one-half microseconds of the horizontal-synchronizing-pulse interval is always devoted to transmission of the subcarrier oscillations 200 required for maintaining the oscillation generator at the receiver in proper phase. When subcarrier is tansmitted during the first 1.5 microseconds, this may be considered as representative of a binary zero. When the frequency of two-thirds the subcarrier is transmitted during that interval, this may be considered as representative of binary one. Although other frequencies may be used, the selection of the two-thirds frequency, preferred in the present system, is made for the purpose of minimizing any effects of the altered frequency on the phase corrector at the receiver. This two-thirds of the subcarrier frequency provides a net phase-corrector error voltage very close to zero. This occurs because, in view of the frequency relationships, the error voltages are obtained at one and one-half cycle intervals, which provides error-voltage polarities which are opposite and cancel. Thus, a manner of transmitting a binary code is provided by filling the first 1.5 microseconds of the horizontal-synchronizing interval by one or the other of two frequencies.

It has been stated previously that the marquee video is interleaved with the program video and then both are modulated on a carrier and transmitted. Figure 4 is a representation of the usual video signal 400 and the horizontal-synchronizing-pulse signal 402. This is shown by way of contrast with Figure 5, which shows a representation of the combined video signal 500 with subcarrier sync burst 502 which is derived in accordance with this invention. The combined signal includes the marquee signal 504, represented by the dotted line, and the program 506, which is interleaved therewith. In the transmission of the combined signals, it must be arranged that the instantaneous energy level in the composite video be maintained below the maximum excursion allowable for video transmission. To do this, the following allotments of signal amplitudes are made: (1) the maximum excursion of the program video (after subcarrier modulation) is restricted to 60 percent of the signal required for complete modulation (100 percent) of the video R. F. carrier; and (2) the marquee video is restricted in amplitude to one-half of the above value—the combined video will then modulate the video carrier at levels always between 0 and 90 percent.

The transmitter

Figure 6 is a block diagram of an embodiment of the invention which is employed at a transmitter. Only the apparatus required for an understanding of the invention and its integration with a television transmitter are shown. The remaining apparatus required for a complete transmitter is well known and will be omitted to simplify the drawings and explanation. Since the marquee signals are handled in the normal manner for handling blackand-white video signals, the output of a marquee camera 600, which scans the marquee material, is applied to an adder 602. The adder combines the marquee-video signal with the output from the program-video portion of the transmitter. The adder also serves the function of properly attenuating the marquee-video signals so that the total modulation will not exceed 30 percent in accordance with the previous discussion. A D. C. clamp 604 serves to establish the average D. C. level for the marquee signals being applied to the adder. Horizontal- and vertical-synchronizing signals for both program and marquee cameras are obtained in well-known manner from a common synchronizing generator 606. The synchronizing generator obtains its oscillations, also, in well-known manner by counting down through a counting chain the oscillations from the subcarrier generator 608. This generator also supplies reference-phase subcarrier oscillations for modulating program video. When a color broadcast is desired, a color-subcarrier generator 610 is phase locked with the subcarrier generator 608 through the synchronization generator.

The video-signal output of a program camera 611, which scans the program, is applied to a balanced modulator 612. The balanced modulator is well known and may be found described, for example, in the book by Fink, entitled Television Engineering, published by McGraw-Hill Book Company in 1952, on pp. 348 and 349. This type of modulator produces only the modulated sidebands and suppresses the carrier. Its input is a subcarrier and the program video. The output of the balanced modulator is applied to a vestigial-sideband-filter network 614, which attenuates the upper sideband for all frequencies greater than about 4.2 mc. The filter output, therefore, is the lower sideband and a vestigial portion of the upper sideband, which is added to the marquee video by means of the adder 602, so that the signals are interleaved. Using the lower sideband of the modulated program video in this manner has the effect of inverting the frequency spectrum of the program video. In other words, the high-frequency components of the program video are now positioned interleaved with the low-frequency components of the marquee video, and vice versa. Since the greater energy components of the program and marquee video lie at the opposite ends of the frequency spectrum, crosstalk between the two signals is thus further minimized by the use of interleaving, using the lower sideband. A vestigial sideband filter 614 is well known by those skilled in the art and is used extensively in television.

The subcarrier frequency for modulating the program video is generated at what may be called a zero, or a reference phase, and is passed through two different phase-delay networks 616, 618, respectively designated at $\phi_1$ and $\phi_2$. The output of these two phase-delay networks is applied to the phase-selector switch, or gating apparatus 620. It should be apparent that the apparatus shown here is identical with that shown and described in Figure 1 of the drawings. The phase selector selects one or the other phase of the subcarrier frequency, in response to the switching signals applied from the coder and control circuits 622. The gate 623 operates to pass the output of the sideband filter 614 to the video adder except for horizontal-blanking and vertical-retrace intervals when the gate switches, in response to the horizontal- and vertical-blanking signals from the synchronization generator, to pass signals from a balanced modulator 624. The video-adder output is applied to the video transmitter 625.

The manner of generating the horizontal-synchronizing signals of the type described will now be explained. The output of the reference-subcarrier generator 608 is applied to the balanced modulator 624. It is also applied to a counter network 626, which divides the frequency by three, or to approximately 1.33 mc. The output of the counter network is applied to a gate 627. Horizontal-drive signals obtained from the synchronizing generator 606 are applied to a delay network 629. This delays a signal until the beginning of a synchronizing pulse. The output of the delay network is applied to a pulse-former network 631, which generates in response thereto a 1.53 microsecond pulse. This pulse opens the gate 627 long enough to allow 2 cycles of the 1.33 mc. oscillation to pass to a code gate 628. The code gate is controlled by the coder-and-control network 622. When it is desired to transmit a binary zero during the horizontal-synchronizing interval, the code gate remains closed and a subcarrier burst is supplied from the balanced modulator 624 during an entire horizontal-synchronizing-pulse interval to the gate 623. The horizontal-synchronizing-pulse interval is established by the horizontal-synchronizing pulse being supplied (as a D. C. pulse) from the control adder 630 to the balanced modulator 624.

For the purpose of inserting a one in the horizontal-synchronizing pulse, which is represented by two-thirds of the frequency of the subcarrier generator during the first 1.53 microseconds of the horizontal-synchronizing interval, the coder-and-control circuits 622, which also receive horizontal-drive pulses, function to open the code gate 628 in time to pass the two cycles of 1.33 mc. from the gate 627 to the control adder 630. The control adder is merely a network for adding the various signal inputs and applying them to the balanced modulator 624 to be mixed with subcarrier-generator output. Its input at this time is a horizontal-synchronizing pulse plus the two cycles of one-third the subcarrier-generator frequency. The mixing of the one-third subcarrier-generator frequency plus the carrier-generator frequency provides a resultant frequency which is two-thirds of the subcarrier frequency for a period during which the two are mixed. Thus, the output of the balanced modulator 624 is approximately four cycles of one-third subcarrier frequency followed by subcarrier frequency for the remainder of the horizontal-synchronizing-pulse interval. This occurs every time a binary one is to be transmitted. When color is desired to be transmitted, the color-carrier burst is inserted through the control adder during the backporch interval.

The control adder also is employed for mixing and inserting in the composite video signal other signals which occur in code bursts for controlling a coinbox and code selector at the receiver in a manner to be explained later. At this point of the explanation, however, it should be noted that coinbox-control signals are transmitted during the first eight lines following the second set of equalizing pulses during a vertical-retrace interval. Further, the coinbox-control signals consist of bursts of one-half the subcarrier frequency.

*The audio arrangement at the transmitter*

It has been previously indicated that the audio-signal portion of the present subscription-television system consists of program sound and barker sound. It is desired to scramble or render unintelligible program sound, both to unpaid receivers or subscribers as well as to nonsubscribers. It is also desired that the barker sound be heard by unpaid subscribers and, also, occasionally by nonsubscribers.

The system employed for coding the audio to achieve these purposes is described in detail and claimed in an application by Phil H. Weiss, as previously noted. Accordingly, the description which follows will be sufficient to familiarize and integrate this system with the present embodiment of the invention. Reference is made to Figure 7, which shows wave shapes to facilitate an explanation of the audio-scrambling portion of the system. The sound system employs two sound channels, designated as channel A and channel B. Both of these are carried by one FM-RF carrier by a frequency-multiplex arrangement. Channel A may be termed the normal sound channel. Channel B is a lower sideband of a 31½ kc.

subcarrier produced by a single-sideband suppressed-carrier modulation. Channel A extends from 0 to 15 kc. and channel B extends from 16½ kc. to 31½ kc. Program sound is carried on one channel and barker sound on the other. From time to time, the assignments of program and barker to channels A and B are interchanged, as may be seen in Figures 7A and 7B, which respectively represent what is transmitted over channel A and channel B.

Program sound is represented by the solid lines 700, and barker sound is represented by the dotted lines 702. Before an interchange of assignments occurs, the barker sound is gradually reduced to zero, or minimum level, while the program sound on that same channel is gradually brought up to the same level as the program sound on the other channel. Accordingly, an interval of overlap, represented by the parallel lines 704, occurs. During this interval, a signal is transmitted which informs a receiver that a switch of assignments will occur. If the receiver is that of a paid-up subscriber, his set will switch from channel A to channel B. Since program is on both channels, no noticeable sound will occur indicative of that switch. An unpaid-subscriber receiver is informed by the signal that a switch is to occur. However, the unpaid receiver switches to follow the barker sound, and not the program sound. Therefore, the unpaid-subscriber receiver will hear barker, which will be gradually reduced as the sound program is gradually brought up, will hear a brief burst of sound program during the overlap interval, and then will begin to hear barker again, since the barker is gradually brought up as the program is gradually reduced on the channel to which it is no longer assigned.

Figure 7C represents a wave shape of the operation of the paid-up subscription-television receiver. As shown there, the paid-up subscription-television receiver functions to follow program from channel A to channel B, back to channel A, and then again to channel B. Figure 7D shows a wave shape of the operation of a subscriber receiver, wherein coin demand has not been paid or satisfied. The set will follow the barker from channel B to channel A, back to channel B, and then to channel A again. Figure 7E represents the reception of a receiver with no subscription apparatus. Since this receiver will only be tuned to channel A, it will hear program, then barker, then barker again, then program, and then a long barker.

It should be noted that although program may be brought up on the two channels to further render the system secure, the program may not be transferred during the overlap interval but may remain on the same channel. With the assignments being transferred at sufficiently rapid intervals, the receiver with no subscription-television equipment will hear garbled, or chopped-up, program sound which is substantially unintelligible. However, periodically a long barker will be inserted, so that the nonsubscribers will know that their receivers are functioning properly and that the sound is being deliberately rendered unintelligible.

The advantages of this type of program switching are that no discontinuities occur by means of which an unauthorized listener may switch between channels. Both the gradual increase and decrease of the signals on both channels, as well as the fact that switching only occurs while program overlap exists, insure this. This also insures that there is no noticeable distraction during the presentation of the program sound. Disturbing sounds may occur when program is brought up and then reduced; however, it is not conceivable that a listener will listen to barker more than two or three times before determining whether he wants to buy the program being transmitted or turn to another station.

A block diagram of a sound system for transmitting signals which will occur in the manner shown in Figure 7A is shown in Figure 8 of the drawings. Two sound transducers, respectively represented by rectangles 800 and 802, are employed to respectively generate program-sound and barker-sound signals. The outputs of these transducers are respectively applied to two faders 804, 806. These faders are potentiometric devices which are well known in the broadcast field and are used for the purpose of increasing sound level from one source, while decreasing sound level from another. For example, a commercial message may be brought up while music is being reduced in intensity, or vice versa. A fader control 808 is employed to control these two faders. This fader control may be a pair of motors, or other device, for moving the shafts of the potentiometric faders. The fader control will operate to provide the assignment of program sound and barker sound to channels A and B in the manner shown in Figure 7A. The fader control is operated in response to signals obtained from the coder and control circuits represented by the rectangle 622 in Figure 6. The output of the fader on channel A is applied to a low-pass filter and delay-equalizing network 810. This filter only permits frequencies up to 15 kc. to be passed therethrough.

It will be recalled that channel B will consist of the frequencies from 16½ to 31½ kc. Accordingly, signals are derived from the synchronizing generator at a frequency of 15,750 cycles which are doubled by a two-times frequency-multiplier and wave-shaper 812. The output is applied to a balanced modulator 814, to be modulated with the output of the fader 806. The modulation output provides the two modulated sidebands of 31½ kc. A band-pass filter 816 removes the upper sideband, so that its output consists of the lower modulated sideband. Both channel A and channel B outputs are added in an adding network 818, and their resultant output is applied to a FM sound transmitter 820, which is the sound transmitter for the television transmitter.

*Coder and control system*

Figures 9, 10, and 11 are block diagrams of the circuitry required in the coder-and-control network 622. This network performs the following functions: It provides signals to the phase selector 620 (Figure 6), in order that the program video be rendered unintelligible; it provides signals at the code gate 628 (Figure 6), in order to transmit switching code for both audio and video; and it provides signals to the fader control 808 for the purpose of changing the assignments of barker and program audio, respectively on channels A and B.

One further function performed, which has not as yet been mentioned, is to generate code-message signals in which these audio- and video-code-switching signals are included. Actually, the code-gate signals are those code-message signals which are applied to the control gate 628 to enable their transmission.

Figure 9 is a block diagram of the sound-control circuitry required to initiate a sound-switching interval and determine the assignments of the contents of the two channels thereafter. A random-noise generator 900 provides pulses to a limited-random-time generator 902. This latter apparatus provides as an output pulses which will occur from one-half second to three seconds apart. Random-noise generators are well known and may comprise, for example, an amplifier for voltages occurring in a carbon resistor. The limited-random-time generator may be a blocking oscillator with a random recovery rate which is driven by voltages from the random-noise generator and which has its time constants arranged between one-half second to three seconds apart. The time at which this output pulse occurs is defined as $T_0$. The output of the limited-random-time generator establishes the commencement of an overlap cycle in the audio system. The $T_0$ pulse passes through an And gate 904 and through an Or gate 906 to start an overlap time counter 908 counting. An Or gate is a buffer circuit which provides an output in response to any one of a number of inputs.

An And gate is a coincidence circuit requiring a coincidence of inputs to provide an output. These circuits are known, and suitable circuits are shown in an article by T. C. Chen, entitled Diode Coincidence and Mixing Circuits in Digital Computers, in the Institute of Radio Engineers Proceedings, volume 38, pp. 511–514, May 1950. The $T_0$ pulse is also applied to channel A and channel B video-control-fader flip-flops 910, 912. These flip-flops serve to control the fader-motor apparatus in the manner previously described.

Upon receipt of the $T_0$ pulse, one of these flip-flops is driven to its set condition (the one not previously so), whereby either the channel A or channel B fader is operated to put program on both channel A and channel B. Since program will already have been on one channel, it is actually only necessary for the channel which previously carried barker to be changed at this time. The overlap-time counter 908 determines the time during which overlap occurs. At 15 milliseconds after the $T_0$ pulse, a first output ($T_0+15$ milliseconds) is obtained from the overlap-time counter, which sets an overlap-time flip-flop 914. This overlap-time flip-flop sends a pulse to the message encoder (Figure 14), to inform it to commence transmitting messsages at a high rate.

The channel assignment to be made during the overlap interval which has just been generated is determined by a random-operating arrangement. This includes another random-noise generator 916, which transmits pulses to two And gates 918, 920. The And gates will not open, however, until a second input is applied from a 15.75 kc. source. This may be derived from the synchronizing generator in Figure 6. Thus, a random-state-generator flip-flop 922 may be set or reset by each 15.75 kc. pulse, if output from the random-noise generator 916 also exists at the time. The output from the random-state-generator flip-flop, when in its set condition, is applied to an And gate 924, which has as its second required input an output from a "long-barker" flip-flop 926. The output of And gate 924 is applied to a second And gate 928. The reset condition of the random-state-generator flip-flop is applied to an Or gate 930, whose output is applied to an And gate 932. The other required inputs to the And gates 928 and 932 consist of the pulse ($T_0+15$ milliseconds) derived from the overlap-time counter 908.

Accordingly, one or the other of the And gates 928, 932 will apply its output to the program-channel-selector flip-flop 934. If And gate 928 provides the output, channel A will thenceforth carry program sound. If And gate 932 provides the output, the program-channel-selector flip-flop is tripped so that thenceforth channel B will carry the program sound. The output of the program-channel-selector flip-flop is transmitted to the message encoder (Figure 14) to denote the channel assignments made. The outputs from the program-channel-selector flip-flop are also applied to two And gates 936, 938. At a time $T_0+50$ milliseconds, the overlap-time counter sends a second output pulse to the overlap-time flip-flop to cause it to be reset. This ends the request to the message encoder for a high code-transmission rate. The same pulse examines the states of And gates 936 and 938, in order to determine which of the two is in condition to provide an output to establish the channel-fader-control flip-flops in response to the selection made by the program-channel-selector flip-flop. If And gate 936 provides an output, channel B fader-control flip-flop will be actuated to decrease program and bring up the barker. If And gate 938 provides an output pulse, then channel A fader-control flip-flop will be reset, and barker will thenceforth be transmitted on channel A.

It was previously mentioned that provision is made herein to notify a receiver without any subscription-television attachment that his set is not malfunctioning but that he is receiving a subscription-television program. This is done by means of a long barker. The long barker is delivered during a fairly extended period of possibly 20 seconds in length, during which no audio switching takes place, and the barker signal is transmitted on channel A (the normal audio channel which is receivable on nonsubscriber television sets). The long-barker flip-flop 926, when in its reset condition, provides the second required output to enable And gates 904 and 924 to function. An interval timer 940, referred to as the "long-barker" interval timer, drives to set condition the long-barker flip-flop at the commencement of the interval during which the long barker is to occur. The setting pulse also is applied to the overlap-time counter through an Or gate 906 and to the channel-fader-control flip-flops 910, 912. This will cause the faders to operate as described above so that program is transmitted on both channels A and B.

The resetting of the long-barker flip-flop, however, also provides an output through Or gate 930 to And gate 932. Therefore, when a pulse ($T_0+15$ milliseconds) is received from the overlap-time counter, the program-channel-selector flip-flop is tripped to assign barker to channel A and program to channel B. And gate 924 and And gate 904 are prevented, or inhibited, from passing pulses as long as the long-barker flip-flop is in the set condition. Accordingly, during this interval, there will be no changing of channel assignments initiated from the random-state-generator flip-flop 922, and there will be no overlap assignments initiated by the limited-random-time generator 902. The overlap-time counter 908 at $T_0+50$ milliseconds will enable And gate 938 to pass a pulse, whereby barker will be brought up on channel A. The long barker will then be delivered.

At the termination of the long-barker interval, the long-barker interval timer provides an output which resets the long-barker flip-flop. This will enable the apparatus shown to function again in the manner described. Accordingly, the system shown operates to initiate an overlap-time interval. This is selected by a limited-random-time generator. The overlap-time interval has its length determined by a counter. The program is brought up on both channels when the overlap-time interval is initiated, and a signal is sent to the message encoder to transmit messages at a higher rate. Upon the occurrence of the next horizontal-synchronizing signal, a random-state generator is tripped to one or the other of its two conditions. Fifteen milliseconds after the initiation of the overlap-time interval, a program-channel-selector flip-flop is set into the same condition as that of the random-state generator. Accordingly, the selection of program and barker assignments is a random one. The assignment made by the program-channel-selector flip-flop is fulfilled 50 milliseconds after the initiation of the overlap-time interval. Meanwhile, the message encoder has received and transmitted an indication of the future channel assignments. Provision is also made for interrupting the operation to insert a long barker on channel A, whereby nonsubscribers are apprised of the program being transmitted and are assured that their receiver is not malfunctioning.

Figure 10 shows a block diagram of the video-control arrangement whereby subcarrier-phase assignments for modulating the program-video signals are determined and encoded. A random-oscillating multivibrator 1000 oscillates to change its state at random intervals between .1 and 3 seconds. At the end of a vertical-blanking interval, the state of this multivibrator is examined and transferred into a video-phase-code flip-flop 1006. This is achieved by applying the outputs from the random multivibrator to two And gates 1002 and 1004. The second required input to these And gates are vertical-blanking pulses derived from the vertical-interval-blanking-pulse generator 1005. The video-phase-code flip-flop 1006 has its output applied to the message encoder (Figure 11) to establish the video-instruction digit to be transmitted. Also, its output is employed to control the rate at which a message is to be sent. This is achieved by two And gates 1008 and 1010. These have as one of their inputs the outputs from the video-phase-code flip-flop and as a second input the outputs from a video-phase flip-flop 1012. This video-phase flip-flop is set into the same condition as the video-phase-code flip-flop by means of two And gates 1014, 1016, which are enabled to transfer the video-phase-code flip-flop condition at the start of the vertical-interval-blanking-pulse generator by an output from the vertical-blanking-pulse generator 1005. Either And gate 1008 or 1010 will transmit a signal at the end of the vertical-blanking interval which is when a difference in flip-flops 1006 and 1012 may occur. This pulse will be applied to an Or gate 1018, and from the Or gate 1018 to the message-rate controller at the message encoder.

The output of the video-phase flip-flop enables one or the other of two And gates 1020, 1022, which have as their second inputs outputs from phase-delay networks 616, 618 (Figure 6). It will be recognized that the structure required for the phase-selector switch 620 is presented here in detail. The video-phase flip-flop is not tripped until the start of the vertical-blanking interval. Therefore, the transfer of subcarriers from phase 1 to phase 2, and vice versa, will not occur until the vertical-blanking interval occurs. This has the advantage of performing switching at a time when there is no picture being viewed and causes no disturbance to the program being viewed. An inverter 1024 is employed to apply an output to the low message-rate encoder in the absence of an input thereto from the Or gate 1018 whereby a low message rate occurs.

To review the operation of the arrangement shown, at .1 of a second to 3-second intervals randomly selected, the subcarrier at phase 1 or subcarrier at phase 2 is selected to modulate the program video. However, such change does not occur until a vertical-blanking interval has started. When a change is to occur, the message rate is increased to insure that the receivers will be switched to the proper phase-demodulating subcarrier in time.

Figure 11 is a block diagram of the message-encoder apparatus. This serves the function of generating the complete code message, which is transmitted to a receiver to enable the receiver to decode the unintelligible picture and sound. A message is transmitted in the manner previously described by different frequency bursts within horizontal-synchronizing-pulse intervals. It will be appreciated that any code messages can be transmitted in this manner which need have no relevance to the video or audio signals being transmitted. However, a code is established for the subscription-television system, which is an embodiment of the invention herein. It is one wherein a code message, consisting of 16 binary digits, is transmitted. Ten of these digits form a key number for identification. Three of the remaining six digits constitute an instruction to the audio-switching circuits which enables them to decode the audio properly. The other three of the remaining six digits constitute an instruction to the video-switching circuits, to enable these circuits to decode the video properly. The key number is changed from program to program by a means to be described subsequently herein.

A high degree of redundancy is introduced into the coding arrangement in two ways. First, the code message is sent several times during a field whenever the instruction to the switching circuits changes. Therefore, should the decoder at a receiver miss the message the first time, it would still have several opportunities before the switching period was over to receive the message and perform the appropriate switching operation. For example, during the audio-overlap time, the message to switch the audio channel can be transmitted many times. Second, the switching-instruction digits may actually consist of one digit repeated three times—that is, in every code message, if the first audio-switch-instruction digit is a one, the remaining two instruction digits will also be ones. Every digit in a complete message is repeated twice each time the message is transmitted. The complete code message, as a result, may actually consist of 32 digits, instead of 16.

Between transmissions of the correct code messages, random zeros and ones are transmitted in order to hinder unauthorized receivers from breaking the code. For the same reason, the correct code message is transmitted aperiodically. The 10 digits of the identification number are stored in a code-storage device 1100. This may be a register consisting of a plurality of flip-flops or switches, or other well-known code-storage arrangements. The 10-digit message is set into the storage device prior to the commencement of the transmission of the program. The digits required to signal video switching or audio switching are received from the sound-control-logic networks and the video-control-logic networks. Shown again is the program-channel-selector flip-flop 934 which, according to its condition (set or reset), inserts a binary one or a binary zero at three places within the code message. Any one of these three digits will signify the audio-channel assignments to the receiver. The video-phase-code flip-flop 1006, shown again here, also inserts a binary one or a binary zero in three places along the code-storage device to signal to the receiver which subcarrier phase should be used for demodulation. The position assignments of the video- and audio-switching digits within a message may be altered from time to time to assist in maintaining code secrecy.

A shift register 1102 has inserted therein random digits from a random-digit generator 1104 through an And gate 1106. This And gate is held open by the output from an inverter 1108 when it is not desired to transfer the message held in the code-storage device 1100 into the shift register 1102. The shift register is a well-known storage device which can receive input either in parallel fashion or in serial fashion. It is shown, for example, in an article by Stevens and Knapton, entitled Gate Type Shifting Register, in the magazine Electronics, volume 22, pp. 186–192, December 1949, published by McGraw-Hill Book Company. The output of the shift register is transferred serialwise out of one end into a second shift register 1110 similar in construction. Both shift registers may be composed of a plurality of flip-flops or flip-flop stages interconnected into a series chain. The registers shift or transfer their contents from one of their interval stages to the adjacent stage in response to transfer pulses at one-half the horizontal-synchronizing frequency which is derived by dividing in half output from the synchronizing generator 606 of the transmitter. The output of the second shift register is applied to the code gate 628 (Figure 6), which inserts the two-thirds subcarrier-frequency bursts into the first one and one-half microseconds of the horizontal-synchronizing interval when it is desired to transmit binary ones.

The method by which each digit of the message is repeated twice should now become apparent. Since the second shift register is transferring digits out at one-half the horizontal-synchronizing-signal frequency and since the code gate 628 opens at horizontal-synchronizing-signal frequency, the code gate transfers each digit twice into the horizontal-synchronizing-pulse intervals which are successive.

The transfer of the code message into the first shift register 1102 occurs responsive to an output from either a low message-rate generator 1112 or a high message-rate generator 1114. The low message-rate generator may comprise an aperiodic-pulse generator. The high message-rate generator may also comprise a pulse generator, but its frequency, or pulse-generation rate, is much higher than the pulse-generation rate of the low message-rate generator.

When sound-control-logic and video-control-logic circuits are not performing any switching operations, their respective output flip-flops (934 and 1006) apply voltage levels to the lines designated as "Lo" in the drawing. These serve to open an And gate 1116 and the output of this And gate serves to open an And gate 1118, which receives as its second input pulses from the low message-rate generator 1112. The output of the And gate 1118, which comprises the output pulse from the low message-rate generator, is applied to an Or gate 1120. This pulse is applied to 16 parallel And gates 1122. These serve to transfer the voltage pattern established in the code-storage device 1100, which is representative of the complete message, into the shift register 1102.

The transfer pulse from the Or gate 1120 also serves to start a message-duration counter 1124. This pulse also sets a message-duration flip-flop 1126 and applies an output to the inverter, which inhibits And gate 1106 so that no random digit may be inserted into the shift register 1102 until transfer of the message into the second shift register 1110 has begun. The message-duration flip-flop applies one of its outputs to an And gate 1128 to prime it for reasons which will be discussed below.

When the code message has been transferred into the first shift register, it is next shifted into the second shift register. Here a comparison is made to determine if the code message is a correct one. Two comparators are used. Comparators are well-known circuits. One of these, 1130, has the 10 digits of the code message relating to identification stored therein. These are compared with the positions established in the second shift register wherein the 10 digits should occur. If there is a match, an output is applied to an And gate 1132. A second comparator 1134 is employed, which has as its input both the switch-control digits derived from the sound-control and video-control logical arrangements. These digits are compared with the digits in the positions established in the code message. If these are not alike, a second required output is applied to the And gate 1132. This supplies a pulse to what may be termed an altered-message source 1134. This serves the function of stuffing false digits into the code message. The reason for this is that the code message is in error in the switching-instruction pulse, and, accordingly, could cause erroneous operations at the receiver. Therefore, by altering the code-recognition portion of the message, this is avoided. The altered-message source may comprise a few stages of a storage device which are enabled to transfer their contents into the second shift register in the same manner as a transfer occurs from the code-storage device 1100 into the second shift register.

The output from the And gate 1132 also is applied through And gate 1128, which is held open by message-duration flip-flop 1126. This pulse is applied from And gate 1128 to Or gate 1120 to initiate again a message transfer from the code-storage device into the first shift register. If the two comparisons of the code-identification message and the switching instructions which form a part of that message are correct, then the complete message is shifted out of the second shift register and controls the code gate 628, whereby the message is transmitted during the horizontal-synchronizing-pulse intervals.

The message-duration counter provides an output pulse to reset the message-duration flip-flop when the desired message has been serially shifted out of shift register one. The comparators operate to prevent the transmission of a false message identification at all times. When the video-control logic and sound-control logic both energize the "Hi" leads, an Or gate 1136 transfers a pulse to an And gate 1138 to hold it open, whereby it may emit pulses from the high message-rate generator to the Or gate 1120.

As a summary of the above, a code-storage device for each program has an identification message plus binary digits indicative of sound and video switching. When a switch of sound or video assignments occurs, a high message-rate generator is enabled to allow transfer of the code message into a shift register a great number of times within a given interval. The shift register transfers the message into a second shift register wherein it is checked for correctness and then transferred out to be transmitted in the successive horizontal-synchronizing pulses. Should an error occur in the transfer, or should a false code message be generated from the random-digit generator, which can cause erroneous operation at the receivers, digits are inserted into the message in the second shift register which insure that the identification number is wrong. Immediately an entry of a correct message into the first shift register to follow the incorrect one is enabled. The number of times a true message is transmitted is determined by the low and high message-rate generators operating through logic, whereby, when a switch is commenced, the high message-rate generator functions and at other times the low message-rate generator functions.

*Coinbox-control-signal generator*

In this invention, coinbox-control signals are generated at the transmitter for the purpose of performing three functions at the receiver: First, the signals set the price, or cost, of a program into the coin-demand mechanism at each receiver. Second, the signals determine the relative positions of a recording medium and stylus by means of which an identifying mark is made on the surface of a code card carried by a code drum indicative of the transaction which has occurred. Third, the signals set the position of a code drum at each receiver for an individual program which will enable the decoding circuits at the receiver to be responsive to the code message for that program.

The coinbox-control signals are transmitted as a series of frequency bursts, each occupying the active portions of about eight horizontal lines during a vertical-retrace interval. These eight lines will be the eight following the second set of equalizing pulses. The frequency of the bursts are actually half the subcarrier frequency. A pulse-stretcher network at the receiver produces a 50-millisecond pulse from each burst. Bursts are spaced so that the proper pulse program is produced at the receiver.

Figure 12 shows a coinbox-signal generator used at a transmitter. In order to obtain the one-half subcarrier frequency, a counter 1200 divides oscillations received from the subcarrier generator 608 by two. These oscillations are applied to a coin-control gate 1202. In order for this gate to open to pass bursts of the one-half subcarrier-frequency oscillations, it must receive coincidentally two other inputs. The coin-control gate may also be inhibited, or kept closed, by the application thereto of horizontal-blanking pulses. This inhibit-pulse source 1204 is employed for the purpose of preventing the transmission of coinbox signals during the horizontal-synchronizing-pulse intervals. One of the two other required signal sources is provided from the vertical-drive-pulse source for the system. This is applied to a delay network 1206, which delays the pulse until after the second set of equalizing pulses. A pulse former 1208 takes the output of the delay network and forms a pulse which is eight horizontal lines in duration. The output of the pulse former is applied to a coin-control gate. Signals are also applied from a coinbox-control source 1210. This source provides pulses whose number and spacing are in accordance with the coin-demand information to be transmitted, code-drum information, and recording or stylus-positioning information.

Each pulse from the coinbox-control source 1210 will be emitted from the coin-control gate 1202 as a frequency burst at one-half the frequency of the subcarrier. These bursts are applied to the control adder 630 in Figure 6, from whence they are applied to the balanced modulator 624. Since the frequency is one-half that of the subcarrier generator, there will be no alteration in the output frequency of the balanced modulator. An arrangement for generating coinbox-control pulses may comprise storage of such pulses on a magnetic drum or magnetic tape, or utilizing a photocell spaced from a light source with means moving between them in a manner to interrupt the light beam to generate the pulses required. It should also be noted that the coinbox-control pulses must be transmitted during the video vertical-retrace blanking interval, and synchronization of the coinbox-control-pulse source with the retrace intervals is required.

The foregoing completes a description of an embodiment of the invention required at a television transmitter for the purpose of transmitting a subscription-television program. The description that follows is for the apparatus required at a receiver, in order to render intelligible the signals which are being transmitted. Again, the apparatus to be shown and described will be for the attachments required for a receiver and will not be the complete receiver. Sufficient data and receiver circuits will be shown, however, to enable those skilled in the art to understand the operation of the invention in conjunction with that of the receiver.

*The receiver*

Figure 13 is a block diagram of the apparatus required at a receiver to enable it to function in the subscription-television system which is an embodiment of this invention. From the last 4.5 mc. intermediate-frequency amplifier in a subscriber's television receiver 1300, an audio I. F. signal is derived in the usual manner and is fed to an FM detector 1302, which is in the present invention subscription-television attachment for a receiver. At the output of this FM detector, channel A and channel B audio outputs are separated respectively by a low-pass filter 1304 and a band-pass filter 1306. The channel A signals at the output of the low-pass filter are directly passed through an audio gate 1308 to the audio-frequency amplifier of the set. It will be recalled that the channel B signals are the modulated lower sideband signals of a 31.5 kc. frequency mixed with the channel B audio. Accordingly, a 31.5 kc. carrier is necessary for demodulation. The horizontal-synchronizing signals generated in the receiver, the frequency of which is 15.75 kc., are applied to a frequency doubler 1310, which generates as its output 31.5 kc. This is applied to a balanced modulator 1312, to which is also applied the channel B output of the band-pass filter. The output of the balanced modulator comprises the demodulated channel B signals. These are also applied to the audio gate 1308. The conversion gain of the apparatus for demodulating channel B is adjusted so that the output-audio level will be the same as the level of the channel A signals. The audio gate 1308 may comprise a pair of switching tubes, one or the other of which is enabled as the result of audio-switching signals, whereby either Barker is followed or program is followed. This is determined by whether or not the coin demand at the receiver has been paid up, as will become more clear subsequently.

The video signal which the receiver obtains can be applied to the kinescope 1318 by either of two paths. The first path places marquee video on the kinescope before payment. The second path places program video on the kinescope after payment. The first path is made up by following the connection from the first video amplifier 1320 through the paid-up gate 1322 through the direct-coupled video amplifier 1324 to the kinescope 1318. The paid-up gate 1322 is not paid up at this time. The second path applies the output from the cathode of the first video amplifier to a double-balanced modulator 1328 through a filter amplifier 1326. A filter amplifier attenuates the low-frequency components and those above 3.8 mc. to provide a band-pass characteristic between 100 kc. and 4 mc. Thus, by attenuating the low-frequency components, marquee-video energy is substantially reduced, since most of the marquee energy is at the low end of the spectrum.

A double-balanced modulator 1328 receives the subcarrier oscillations in proper phase from a phasing gate 1330. It also receives the output of the filter. The double-balanced modulator will provide no output in the absence of either subcarrier input or input from the filter. The output of the modulator is the decoded-program video. This is passed through an 8 mc. trap and a 4 mc. low-pass filter 1332, whereby harmonics are removed. The output of this trap and low-pass filter is applied through the paid-up gate to the D. C. coupled video amplifier.

Subcarrier oscillations for demodulation are generated by a subcarrier oscillator 1334. This oscillator is maintained phase-locked with the subcarrier generator at the transmitter in well-known manner by employing a phase detector 1336 which compares the phase of the oscillations generated by the oscillator 1334 with those derived from the burst gate 1338. These burst-gate oscillations are derived from the horizontal-synchronizing pulses, which are obtained from the video input to the paid-up gate 1322. A delay network 1340 is employed to match the horizontal-synchronizing-interval bursts derived directly from the video signals with the horizontal-synchronizing-pulse signals derived from the horizontal-synchronizing-pulse separator 1342. This delay is required because there are delays in the synchronizing-generator circuits at the receiver. The burst gate 1338 is accordingly opened at the proper horizontal-synchronizing intervals to permit the bursts of subcarrier oscillations occurring during these intervals to be compared in phase with the oscillations generated at the receiver. A reactance tube 1344 operates in well-known manner to correct any phase deviations.

Two phase-delay networks 1346, 1348 provide phase delays $\phi_1$ and $\phi_2$, which are identical with those provided at the transmitter by delay networks 616 and 618. These delay networks are preferably made of passive elements to enable ready duplication. The phasing gate is controlled by the output from a decoder 1350. The phasing gate is switched in synchronism with the switching at the transmitter so that the video program may be properly presented upon the kinescope when the coin demand at the receiver is satisfied.

Coinbox signals are separated from the remainder of the transmitted signals by applying the output of the 8 mc. trap and 4 mc. low-pass filter 1332 to a narrow-band amplifier 1352. This narrow-band amplifier applies its output to a 2 mc. filter 1354. The output of this filter comprises the coinbox-signal bursts which are transmitted at one-half the subcarrier frequency, which is substantially 2 mc. The output of the filter is applied to an envelope detector and pulse stretcher 1356, which converts these 2 mc. bursts into 50-millisecond or 400-millisecond pulses which are applied to control the coinbox and code drum apparatus 1358. The envelope detector and pulse stretcher are merely a rectifier network having resistor and condenser values selected to provide the required time constants.

As soon as the coinbox signals are received, the coinbox supplies a control signal to a sync gate 1360. This gate switches an envelope detector 1362 and a sync clipper 1364 into the synchronizing circuits of the system. It will be recalled that the horizontal-synchronizing pulse consists of frequency bursts. Accordingly, an envelope detector and sync clipper are employed to convert these bursts into pulses usable by the receiver. The output of the sync clipper consists of horizontal-synchronizing pulses, which are re-inserted into the video signal.

The narrow-band amplifier 1352 has its output also applied through a delay network 1366 to a code gate 1368. The code gate is opened during the horizontal-synchronizing-pulse intervals by means of control pulses which are derived from the output tube 1342. This enables a decoder 1350 to receive the frequency bursts which were inserted into this interval at the transmitter for code-message-transmission purposes. The reason for the delay network 1366 is the same as for the delay network 1340. The decoder also receives horizontal- and vertical-synchronizing-signal input.

The coinbox 1358, when coin demand has been satisfied, sends signals to the audio paid-up gate 1370 and to the video paid-up gate 1322 to cause them to operate. This enables the kinescope to show the program video and the audio system to follow the program audio as it is being switched between channel A and channel B, instead of barker.

The receiver-decoder unit

Figure 14 is a block diagram of the decoder unit employed at the receiver. The code gate 1368, previously shown in Figure 13, supplies one-third subcarrier-frequency bursts for every one in the code message being transmitted. The reason these are one-third and not two-thirds subcarrier-frequency bursts is because these signals have been previously passed through the double-balanced modulator and have thus been demodulated. These bursts are applied to a pulse stretcher and power amplifier 1400. The output, consisting of the presence or absence of pulses in accordance with the binary code being transmitted, is then applied to a magnetic amplifier 1402. A shift register 1404 is employed to temporarily store the incoming code message while the identification-code-number part of the message in the shift register is inspected to determine if it is the number which has been established for the particular program being transmitted. The manner of establishing the code for a program at a receiver is provided by a code drum 1406, which is described in detail subsequently. A vacuum-tube shift register may be employed, but it is preferred to employ a magnetic-core shift register which may be of the type described by An Wang and W. D. Woo in an article in the Journal of Applied Physics, vol. 21, pp. 49–54, January 1950, entitled Static Magnetic Storage and Delay Line.

It is to be noted that the forming of the code message and its entry into the register are at a 7.88 kc. rate. This is derived by obtaining the horizontal-synchronizing signals generated at the receiver and applying them to a ÷2 counter and power amplifier 1408. Its output is applied to a pulse-former network and power amplifier 1410. Its output is employed to form message pulses to drive the magnetic amplifier, and to shift the shift register at one-half the line rate. Since the code message is transmitted at one rate and is handled at one-half that rate, then the 32 digits of the transmitted message are actually seen as 16 in the shift register.

The content of the shift register is under continual surveillance, and when the identification-code number in a message corresponds to the one established for the program an output from the shift register is enabled, which is applied through an RC integrator 1412 to an And gate 1414. The output of the pulse-forming network is also applied through a delay element 1416 to open an And gate 1414. The purpose of the delay is to first enable the number in the shift register to be sampled and an output obtained upon recognition. The output of this gate is applied to two other And gates 1418 and 1420. One of these, 1418, has as its other required input a signal which is derived from the register when the sound-switching instruction is to go from channel A to channel B. The other of these, 1420, has as its input a signal derived from the register when the sound-switching instruction is to inform the receiver to go from channel B to channel A. An audio-control flip-flop 1422 is set or reset in accordance with these instructions. Its output is applied to the audio gate 1308. It will be noted that the audio-control flip-flop has two outputs. These are employed to open a circuit in the audio gate for passing channel B when the flip-flop is in one condition and to open a circuit in the audio gate to pass channel A when the flip-flop is in the other condition. The paid-up gate determines the response of the audio-gate circuits to its output in accordance with whether or not coin-demand payment has been made. It is to be noted, however, that neither gate 1420 nor gate 1418 is opened unless the proper message-identification number has been detected.

And gate 1414, similarly, serves to enable And gates 1424 and 1426 to control the condition of a video-control temporary-storage flip-flop 1428 from the video-switching signals in the register. Thus, if the video instruction is a binary zero, then the RC integrator 1425 output will be able to trip the video-control storage into one state through And gate 1424 and if the video instruction is a one, the flip-flop 1428 is transferred to its other state as a result of the pulse received through And gate 1426. The reason for storing the switching signals is since the encoding-subcarrier-phase changes occur only during the vertical-retrace interval the switching signals must be stored until that time to obtain synchronism.

A video-control flip-flop 1430 is set into the same condition as the video-control temporary-storage flip-flop when a vertical-synchronization signal is applied to the two gates 1432, 1434 coupling the two flip-flops to achieve such transfer. The output of the video-control flip-flop is applied to control two gates, which are represented by the phasing gate 1330 (Figure 13). One or the other of these is rendered conducting, whereby subcarrier oscillations at phase 1 or phase 2 may be applied to the double-balanced modulator 1328.

The magnetic shift register actually consists of two registers which shift a number and its complement. Thus, both ones and zeros are stored in a positive manner. This arrangement makes it possible to couple a sensing winding on each core of the register. Each of these is connected in series with an integrating network and a switch arrangement on the code drum which enables a selective closing or not of the circuit to the integrating network. Thus only those circuits which provide a pattern corresponding to the message-identification number for the program are closed. This permits recognition to be achieved in a very simple manner.

In summary, bursts of the code portion of the horizontal-sychronizing pulse are detected and converted to code pulses. One-half of the binary digits in a transmitted 32-digit message are then stored in a 16-binary-digit push-pull shift register. There the code message has its identification-number portions compared with the code number established for the program by selectively closing sensing-winding circuits through the code drum. Upon recognition of the message then the coded-sound-switching signals are permitted to control a flip-flop so that the proper program sound is heard. Also, video-switching signals are permitted to control the phase of the subcarrier which is employed to demodulate the program video, whereby the program video may be properly seen and the marquee is not seen.

The code drum

Figure 15 is a perspective view of the code drum and program-identification-recording mechanism. The code drum 1500 comprises a cylinder which may be advanced by a solenoid 1502 and escapement 1504 to an angular position corresponding to what may be termed as the proper decoding position. This position is assumed when the code drum is stepped or moved by the advance solenoid 1502 in response to pulses which are transmitted as 2 mc. bursts during the vertical-retrace interval. On the surface of the cylinder are printed circuit tracks 1506. Placed over the cylinder is a code card 1508, which has holes in it. The positioning of these holes is in accordance with different identification-code numbers, a different one of which is established at each different angular position of the drum. A plurality of brushes 1510 are positioned to make contact with the printed-circuit tracks through the holes in the code card. Thus, a recognition arrangement is afforded, since circuits are selectively completed through different ones of the sensing windings on the magnetic-core register in accordance with the code pattern established by the card holes at each different angular position of the code drum.

The program-recording or identification mechanism is also shown. It will be appreciated that the position to which the code drum is rotated places a different area of the card under a stylus 1512. The stylus may be moved laterally along the drum by means of an advance solenoid 1514, which functions in response to pulses to rotate an escapement wheel 1516. This, in turn, drives an identity cam 1518, which, through a lever arrangement 1520, moves the stylus laterally along the drum. The stylus touches the code card to make a recording mark upon an instruction from the coin-demand apparatus, which issues when payment is made. The marks are made in different positions for each different program. Accordingly, a card can indicate the programs purchased by correlating the mark positions with the code-drum-rotating pulses and stylus-advancing pulses sent for each program. This may be easily done by positioning a perforated master card over the recording area of a card.

The release solenoids 1522, 1524 function to release the code drum and the stylus apparatus when pulses are no longer received from the transmitter. Otherwise, they engage the respective escapement mechanisms and maintain them in the positions to which they are rotated.

Receiver-coinbox-control arrangement

Figure 16 shows wave shapes as reconstituted at a receiver for a typical sequence of coinbox operation. The wave shapes shown are typical and will be described through a typical sequence of operations to show how each element of the system responds to these reconstituted pulses. When a receiver is tuned to a subscription-television channel, the coinbox-control circuits wait for a long 400-millisecond positive pulse 1600, which is called the start pulse, to appear. It will be recalled that although the coinbox pulses are transmitted as 2 mc. bursts, a pulse stretcher at the receiver produces a 50-millisecond pulse from each burst. Spacing of these bursts may be used to determine the width of the pulse at the receiver. The 400-millisecond pulse, accordingly, may be generated by closely spacing substantially eight bursts. A start pulse is followed by a first series of pulses 1602, which advance a price wheel in the coinbox. The first pulse advances the price wheel from a blank, inactive position to a position where it indicates a maximum price. The second pulse decreases this maximum price for a given amount. The third pulse decreases the price by a further amount. As many of these pulses are transmitted as are required to diminish the maximum amount to the amount of the cost of the program which is to be viewed.

At the end of the pricing-pulse sequence, a long, negative pulse is transmitted which is 400-milliseconds in duration. This pulse 1604 causes the circuits to the pricing solenoid to be broken, so that the following pulses will not cause further advances in the price wheel. The pricing cycle is followed by a second sequence of pulses 1606, which cause the recording stylus to be positioned laterally. Each pulse after the long, negative pulse advances the stylus one step. The next long, negative pulse 1608 initiates the angular positioning of the code drum. This is followed by one further short pulse 1610, which terminates the stylus, or identity cam, operation. A succeeding 400-millisecond pulse 1612 insures that the identity cam is stopped, and the code drum can be rotated further in response to further 50-millisecond pulses 1614. After the transmission of the number of these pulses required to place the proper code card openings under the brushes 1510 (Figure 15), a cycle is completed.

The next code cycle commences when a long, positive pulse 1600 is transmitted again. This long, positive pulse breaks the circuits to the code drum so that further pulses will not advance it beyond the correct position already secured for the program. As previously pointed out, all elements of the mechanism remain in the position in which they are left at the end of the first complete cycle of the coinbox-control signals until the viewer decides to purchase the program or the program ends. As long as the 2 mc. frequency bursts carrying the coinbox-control signals are received, the price wheel of the coin-demand mechanism, the code drum, and the identity cam are held in the positions to which they are directed by the pulse by pawls. A failure of bursts for various causes allows all mechanisms to be returned to their initial position. However, the time constant of these circuits is made such that the release solenoids are not actuated by minor power disturbances lasting a few seconds. At the end of each program, the bursts are discontinued in order to reset all the mechanisms before the start of the next program.

Figures 17 and 18 are views of the coin-receiving mechanism, Figure 17 being an exploded view in perspective and Figure 18 being a side view of the arrangement. It should be noted that other suitable coin-receiving mechanisms have also been described in the previously noted applications to Loew et al., and to Gottfried et al. The one to be described here is simpler in construction than these others and is preferred. The coin-receiving mechanism provides the functions of indicating the coin demand to a subscriber and enables the satisfaction of that coin demand when the subscriber deposits the indicated coinage.

The apparatus comprises a pricing wheel 1700, a credit wheel 1702, and a coin-evaluating wheel 1704, each of which is mounted on a common axis to be independently rotatable. The viewer looks at the cost and his credit through slots in the cover for this mechanism (not shown). A solenoid 1706, in response to pricing pulses, advances the price wheel from a stop position in successive increments. Each increment occurs in response to a separate pulse. The increments decrease the amount of the indicated coinage from a maximum to the amount required. A toothed holding member 1708 is positioned between the price wheel and the credit wheel and its function is to hold the pricing wheel at the position to which it is rotated by the solenoid 1706 and also to limit its extremes of travel. A retaining pawl 1712 extends to and co-operates with the toothed holding member in performing these functions. A second pawl 1710 extends to the credit wheel and serves the function of moving the pricing wheel when the credit wheel moves in the proper direction. Both of these retaining pawls move with the pricing wheel, are solenoid operated, and are released when pulses are no longer being transmitted. Their solenoid windings are inside the pricing wheel, as represented by the dotted lines.

A coin door (not shown) prevents coins from being inserted into the coin-evaluator wheel until the price wheel has been set to the price of the program. It is then opened. The coin evaluator, operating in accordance with principles well-known in the art, measures the diameter of each deposited coin and converts this into an appropriate angular rotation of the pricing wheel. A motor 1714 turns a wheel 1716, which drive is transmitted by means of a shaft to the coin-evaluator-mechanism shaft 1718. A complete revolution of the coin-evaluator mechanism is made for every coin which is deposited therein. A coin-value rod 1720 engages the credit wheel. The coin-value rod rotates with the coin evaluator. The position at which it engages the credit wheel to rotate it therewith is a function of the coin deposited. The amount the credit wheel is rotated is determined by the position at which it is engaged by the coin-value rod. The credit wheel is rotated against the force of a spring (not shown) which, when the coin evaluator has completed a rotation and a restraining pawl is released, thereby drives the credit wheel in the opposite direction. The credit wheel then, through the pawl 1710, carries with it the price wheel. The direction of rotation is the same as the price wheel was previously moved by the solenoid 1706. This direction is the one which reduces the amount of the coinage indicated.

The coin evaluator completes a revolution each time a coin is deposited, whereby it may receive an additional coin. Thus, the price wheel is rotated until zero or "paid" is indicated. It is held against further movement at this point by the pawl 1710 engaging the holding member. At this time, a paid switch (not shown) is closed by the pawl. This initiates the operations previously described, which enables the subscriber to view and hear the program being transmitted and enables a recording to be made. The amount of coinage deposited need not be exactly the amount demanded by the price wheel. It can exceed such amount. When full payment is exceeded, the price wheel is held and can no longer be rotated in the direction in which the credit wheel is rotated by the evaluator as a result of the excess coinage. When the credit wheel is rotated past the paid position, it moves against the force of a spring and stores up the amount of credit as spring force.

The position of the credit wheel is maintained by the credit release pawl 1722. When the program is terminated, the two pawls 1710, 1712 are retracted so that the price wheel can be returned to its starting position, but the credit wheel is still maintained in the position retaining the spring tension which has been stored by the overpayments. When a new coin demand is to be satisfied, the spring tension is released by the lifting of the credit release pawl. When this happens, the spring will drive the credit wheel in a direction to reduce the amount of coinage established by the price wheel. The pawl 1710 again serves the function of rotating the price wheel with the credit wheel in a price-reducing direction.

Figure 19 is a block diagram of the receiver-coinbox-control logic. This apparatus represents a relay arrangement whereby the pulses which are transmitted as 2 mc. bursts and which are converted into the form shown in Figure 16 are channeled to operate the proper apparatus. Other suitable "operating-pulse-train" channeling-relay equipment is shown and claimed in an application by Robert E. Gottfried for a Pulse Responsive Control Apparatus, filed May 10, 1951, Ser. No. 225,653, and issued January 17, 1956, as Patent No. 2,731,620 and assigned to this assignee. In that application, transmitted pulse trains operate relay apparatus so that a coin demand is established at a coinbox and a recording is made on magnetic tape upon coin demand being satisfied. The input to this apparatus is obtained from the envelope detector and pulse stretcher 1356. It will be recalled that this apparatus provides pulses which are 50 milliseconds for each transmitted burst, or when the bursts are spaced sufficiently closely and there are a sufficient number of them a 400-millisecond pulse can be derived therefrom. The output of the envelope detector and pulse stretcher is applied to a stepping-control relay 1900. The stepping-control relay provides the pulse output shown in Figure 16. With the price wheel of the coin-receiving mechanism shown in Figure 17 on the blank position, the initial 400-millisecond positive pulse sets a price-wheel and code-drum-control relay 1902, so that a price-wheel-control gate 1904 is opened. The pricing pulses which follow the initial positive 400-millisecond pulse then can throw this gate to the price-wheel advance solenoid 1906 (which is 1706 in Figure 17). When the price wheel has been moved from its blank position, the next 400-millisecond negative pulse resets the price-wheel and code-drum-control relay 1902 and sets an identifying-cam-control relay 1908. This relay enables the opening of the identity-cam-control gate 1910, and pulses from the stepping-control relay 1900 are fed through the gate to the identity-cam advance solenoid 1912 (solenoid 1514 in Figure 15). When the identity-cam advance solenoid has moved from its starting position, the price-wheel-control gate 1904 is inhibited, or closed, by the output of an identity-cam-state recognizer 1914, which also applies an output to a drum-control gate 1916 to enable it to be opened. Under these conditions, the succeeding 400-millisecond pulse (1608) causes the price-wheel and code-drum-control relay to open the gate 1916 and allow pulses from the stepping-control relay to reach the code-drum advance solenoid 1918 (1502 in Figure 15).

There then is a single, positive pulse 1610 between two negative pulses 1608, 1612. This pulse moves the code drum one step from its blank position. When this occurs, the identity-cam-control relay is reset by an output from a code-drum-state recognizer 1920. When the next 400-millisecond pulse (1612) occurs, the succeeding pulses 1614 then continue to advance the code drum. The long, positive pulse which starts the next cycle of control signals will close the price-wheel and code-drum-control relay 1902, so that further pulses will not be able to get through the gates. With the code-drum-off blank position, the code-drum-control relay in the off position, and the paid-up relay 1922 in a "not paid" state (because coin demand has not yet been satisfied), a coin-door-control gate 1924 is opened and through it a coin-door solenoid 1926 is actuated to open the coin door whereby coins may be deposited in the coin-receiving mechanism.

When the price wheel 1700 is advanced to the paid position, a paid switch 1928 is closed and the paid-up relay 1922 is actuated. The paid-up relay also actuates the paid-up gates (1370, 1322 in Figure 13). A monitor relay 1930 is controlled by pulses from the envelope detector and pulse stretcher 1356. Failure of these pulses over a period of time causes a release-control signal to be sent to a master-release solenoid 1932 in the coinbox. Energizing this solenoid energizes the various release solenoids at the code drum (1522), at the identity cam (1524), and at the price wheel (1710, 1712), whereby the price wheel is returned to its starting position. The monitor relay 1930 also controls the sync gate 1360, which connects the sync circuit of the subscription-television attachment with the subscriber's television set.

Figure 20B:
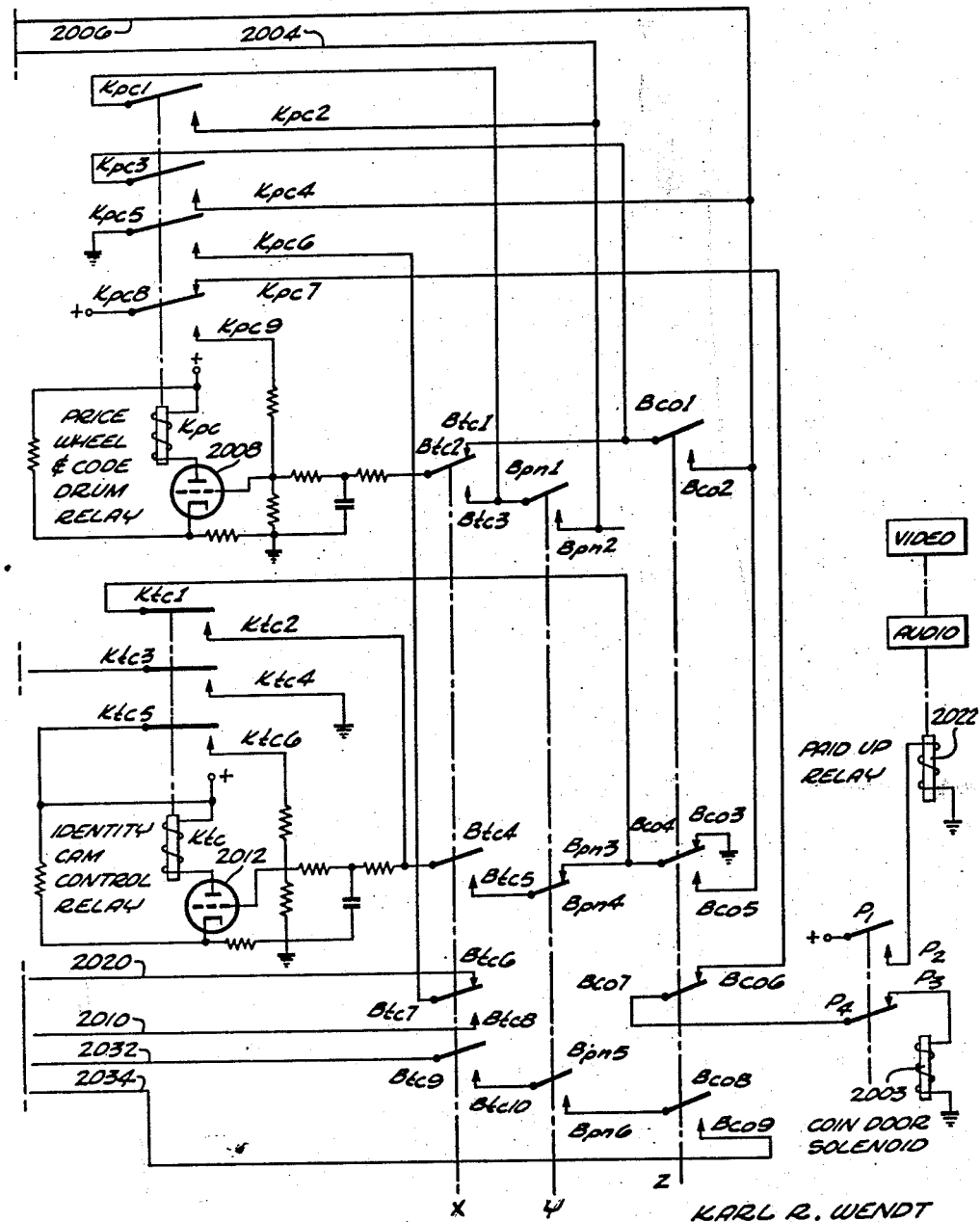

Figures 20A and 20B are circuit diagrams of the relay and switch arrangements which are embodied in the block diagram arrangement of Figure 19. These are considered together here. The input from the narrow band amplifier 1352 drives the 2 mc. filter 1954 in the grid of tube 2000. The envelope detector and pulse stretcher referred to as 1356 on Figure 19 includes structures 1352, 1354, 2000, and, in addition, the K*sc* relay coil and condenser 2001. It should be noted that the pulses shown in Figure 16 are generated by the stepping relay. Further, the 2 mc. bursts occur only where a positive pulse is designated. The negative pulses are generated by the stepping relay in the intervals between bursts. The tube 2000 has the coil of the stepping-control relay K*sc* in series with its plate and with the coin-door switch. The coin-door switch 2002 is mechanically operated to open the series circuit when the coin door opens and is reset to the position shown when the price wheel (1700) is returned to its initial blank position. The operation of relay K*sc* applies power to lead 2004 and ground to lead 2006, which reverses the situation existing when the relay is not operated. Relay K*sc* opens and closes to generate pulses in response to the input from the narrow band amplifier. This applies signals to the price wheel and code drum relay K*pc*. The circuit for this may be traced through lead 2004, switch contacts B*pn*1 and B*pn*2, B*tc*3 and B*tc*2, and tube 2008, which has the K*pc* relay coil in series therewith. All the B*tc* contacts are mechanically linked as represented by the dotted lines terminating in X. These contacts are shown in a nonoperated position. They are maintained operated mechanically while the identity cam (1518) is in its nonoperated position. All the B*pn* contacts similarly are mechanically operated simultaneously as represented by the dotted line terminating in Y. These are shown in the nonoperated position. These are maintained operated when the price wheel (1700) is in its blank position. Contacts B*co* are mechanically joined as represented by the dotted line ending in Z. They are maintained operated (being shown in nonoperated position) while the code drum (1508) is in its blank position.

It should be noted that the time constant and bias values of the tube 2008 require a pulse considerably longer than 50-milliseconds to affect the tube or to cause it to conduct or release. The grid of the tube is connected through K*pc*9 and K*pc*8 to a source of positive voltage, whereby the tube is maintained conductive and the relay operated until released. The coinbox-price-wheel-advance solenoid is the first one enabled to respond to pulses 1602 to establish the price or coin demand. This circuit may be traced through contacts K*sc*8, K*sc*7, the solenoid 1706, lead 2010, contacts B*tc*8, B*tc*7, K*pc*6, and K*pc*5. When the price wheel is advanced from its blank position, contacts B*pn* assume the position shown. Then relay K*sc* is not operated over a 400-millisecond interval. This grounds the input to the network in the grid to tube 2008 for the 400-millisecond interval, causing it to cease conduction and release the K*pc* relay. This operation may be traced from ground through contact K*sc*1, K*sc*2, lead 2004, contact K*pc*2, K*pc*1, B*tc*3, and B*tc*2.

During this latter 400-millisecond interval, tube 2012 is rendered conductive. The path may be followed from a positive voltage source through contact K*sc*4, K*sc*5, lead 2006, contact B*co*5, B*co*4, contact B*pn*3, contact B*pn*4, contact B*tc*5, contact B*tc*4, to the input circuit of the grid. The input circuit is the same as for tube 2008 and requires a 400-millisecond pulse to operate the tube. The tube is held conductive through contacts K*tc*5 and K*tc*6 of relay K*tc*.

The next series of pulses 1606 advance the identity-cam solenoid 2014, thus advancing the stylus axially along the code drum. This circuit may be traced through a voltage source, contacts K*sc*8, K*sc*9, the solenoid 2014, lead 2016, contacts K*tc*3, K*tc*4 to ground. The removal of the identity cam from blank position opens up contacts B*tc* to the positions shown in the drawing.

The next 400-millisecond interval 1608 causes tube 2008 to become conductive, thus actuating relay K*pc*. This path may be traced from voltage source through contacts K*sc*4, K*sc*5, lead 2006, contacts B*co*2, B*co*1, contacts B*tc*1, B*tc*2 to the input to tube 2008. This enables a succeeding pulse 1610 to advance the code drum 1508. This path is traced from voltage source through contacts K*sc*8, K*sc*9, solenoid 2018, lead 2020, contacts B*tc*6, B*tc*7, K*pc*6, K*pc*5 to ground. This causes contacts B*co* to be operated to the position shown in the drawing. The next 400-millisecond interval 1612 results in tube 2012 being rendered nonconductive. This path may be followed from ground through contacts B*co*3, B*co*4, K*tc*1, K*tc*2, to input circuit of tube 2012.

Tube 2008 remains conductive. Thus the succeeding pulses 1614 operate solenoid 2018 through the aforementioned path.

When a new pulsing cycle is transmitted the initial positive pulse 1600 closes relay K*sc*. This opens K*pc* through the following path, from ground through contacts K*sc*6, K*sc*5, lead 2006, contacts K*pc*4, K*pc*3, B*tc*1, B*tc*2, to input circuit of tube 2008.

Since contacts B*tc*, B*pn*, B*co* are all in the positions shown in the drawing as a result of identity cam, price wheel, and code drum all being off blank positions, succeeding pulse cycles will not operate the relay apparatus. The switch 2002 of the coin-door-solenoid 2003 is operated to assure this. The solenoid path may be traced from ground through the solenoid winding 2003, through contacts P3, P4, B*co*7, B*co*6, K*pc*7, K*pc*8 to voltage source.

When coin demand is satisfied, the paid-up relay 2022 operates as may be seen by following the path from ground through the solenoid coil 2022 through contacts P2 and P1 to voltage source. The video and audio paid-up gates also are operated. Solenoid 2003 drops out when contacts P1 and P4 are operated by the price wheel assuming the paid-up position. This, however, does not drop out contact 2002.

The monitor and time-delay relay K*n* is held operated as long as pulses are transmitted. An input to tube 2030 may be traced from the cathode of tube 2000. Relay K*n* is in series with the cathode of tube 2030. The initial path may be traced from tube 2000 cathode through lead 2032, contacts B*tc*9, B*tc*10, B*pn*5, B*pn*6, B*co*8, B*co*9, lead 2034, through condenser 2036 to the grid of tube 2030. The operation of the relay K*n* closes contacts K*n*5 and K*n*6, thus shorting the previous path.

Tube 2000 continues becoming conductive upon receiving input pulses since B+ is always available through switch 2002. During long intervals of nonconduction of tube 2000, condenser 2038 maintains the tube 2030 conductive. Its value is selected to be large relative to condenser 2036. Whenever tube 2030 is rendered conductive, condenser 2038 charges through diode 2040 and the cathode of tube 2030. The time constant of condenser 2038 and resistor 2042 is selected to be large enough so that only a prolonged absence of pulses will permit the K*n* relay to drop out. This will operate the master coinbox-release solenoid 2044 (1932), which releases all holding solenoids.

The contacts K*n*1 and K*n*2 constitute the sync gate (1360).

The logic of the arrangement described in Figure 19 is shown and described here. The gates in that diagram will be recognized as being actually the respective relay contacts.

The above description shows a novel and useful arrangement for transmitting and receiving marquee and program signals, as well as program audio and barker audio. The fact that the description has been made using as the embodiment a subscription-television arrangement should not be taken as a limitation upon the invention, since it will be readily recognized by those skilled in the art that a system for transmitting a first video signal and a second coded video signal frequency interleaved therewith is described, as well as a novel means for transmitting the decoding information without increasing the bandwidth beyond that presently established. Further, the receiving arrangement whereby this novel transmission may be decoded and rendered intelligible is also novel and useful. Also, although a specific embodiment of the invention has been described, it will be appreciated that this is not to be construed as a limitation, but that alternative arrangements can be made which are still within the spirit and scope of this invention.

We claim:

1. In a television system, means for generating first video signals, means for generating second video signals, means for generating code signals, means for frequency interleaving said first and second video signals including means for generating a reference-phase subcarrier, second and third subcarriers which are each phase displaced by different amounts from said reference-phase subcarrier, and means to modulate said second video signals upon said second or said third subcarrier responsive to said code signals.

2. In a television system, means for generating first video signals, means for generating second video signals, means for generating horizontal synchronizing signals for said first and second video signals, means for generating code signals, means for frequency interleaving said first and second video signals including means for encoding said frequency-interleaved second video signals responsive to said code signals, and means for inserting said code signals within said horizontal synchronizing signals.

3. In a television system as recited in claim 2 wherein said means for encoding said frequency-interleaved second video signals responsive to said code signals includes means for generating a reference-phase subcarrier, means for deriving from said reference-phase subcarriers second and third subcarriers which are each phase displaced by different amounts from said first subcarrier, and means to modulate said second video signals upon said first or said second subcarrier responsive to said code signals.

4. In a television system as recited in claim 3 wherein said means for generating horizontal synchronizing signals includes means for establishing horizontal synchronizing signal intervals, and means for filling said intervals with bursts of said reference-phase subcarrier.

5. In a television system as recited in claim 4 wherein said means for generating code signals includes means for generating an oscillation having a frequency which is different from that of said subcarrier, and means to insert in selected ones of said horizontal synchronizing signal bursts of said different frequency oscillation followed by bursts of said subcarrier to establish said code signals within said horizontal synchronizing signals.

6. In a television system of the type wherein signals in code are generated at a transmitter and a composite video signal is to be transmitted, means to insert said code signals within the composite video signal to be transmitted comprising means for establishing horizontal synchronizing signal intervals for said composite video signal, means for generating oscillations having a first frequency, means for generating oscillations having a second frequency, means responsive to said code signals for inserting a burst of said first frequency oscillations during selected ones of said horizontal synchronizing signal intervals, and means responsive to said code signals for inserting a burst of said first and second frequency oscillations during other selected ones of said horizontal synchronizing intervals whereby said code signals are inserted within said composite signal.

7. Apparatus for viewing second video signals in a television system of the type wherein a composite video signal is transmitted which includes frequency interleaved first and second video signals, said second video signals being modulated on one or the other of two out-of-phase subcarriers in accordance with a key code and which includes said key code in horizontal synchronizing signals as bursts of subcarrier at a reference phase to which said out-of-phase carriers are referred, or as bursts of oscillations at a second frequency followed by said subcarrier bursts, said apparatus for rendering said second video signals viewable comprising means to derive the envelope of said oscillations at a second frequency and subcarrier bursts to obtain horizontal synchronizing pulses, means to generate oscillations at the frequency of said subcarrier, means for detecting any phase differences between said generated subcarrier oscillations and said subcarrier bursts in said horizontal synchronizing signals, means to generate from said generated subcarrier a third and fourth subcarrier which are respectively in phase with said two out-of-phase subcarriers, means for detecting said code from said horizontal synchronizing signals, a demodulating network, means for applying said composite video signal to said demodulating network, and means for applying said third or said fourth subcarrier to said demodulating network responsive to said detected code to derive viewable second video signals.

8. A receiver for utilizing horizontal synchronizing signals in a television system of the type wherein a composite video signal is transmitted including horizontal synchronizing signals each of which is formed in accordance with a code as either a burst of oscillations at one frequency or as a burst of oscillations at a second frequency followed by a burst of oscillation at said one frequency, said receiver for utilizing said horizontal synchronizing signals comprising means for demodulating the envelope of said horizontal synchronizing signals to derive horizontal synchronizing pulses, means to detect the presence of said second frequency oscillations in each horizontal synchronizing signal, means to detect the absence of said second frequency oscillations in each horizontal synchronizing signal, and means to recognize a predetermined sequence of detected presences and absences of said second frequency oscillations to detect said code.

9. A receiver for utilizing horizontal synchronizing signals in a television system of the type wherein a composite video signal is transmitted wherein there are frequency-interleaved video signals employing a subcarrier for interleaving, and wherein there are horizontal synchronizing signals each of which is formed in accordance with a code either as a burst of oscillations at the frequency of said subcarrier or as a burst of oscillations at a second frequency followed by a subcarrier burst, said receiver for utilizing said horizontal synchronizing signals comprising means for demodulating the envelope of said horizontal synchronizing signals to derive horizontal synchronizing pulses, means for recognizing the presence or absence of said second oscillation frequency in a predetermined arrangement in a sequence of horizontal synchronizing signals whereby said code is detected, means to generate a subcarrier for detecting said interleaved video signals, means for comparing the phase of the subcarrier burst in each horizontal synchronizing signal with that of said generated subcarrier, and means for correcting said generated subcarrier to eliminate any differences.

10. In a subscription television system, means for generating video signals representative of a marquee, means for generating video signals representative of a program, means for generating code signals, means for frequency interleaving said program video signals and said marquee video signals including means for encoding said frequency-interleaved program video responsive to said code signals, means for generating horizontal synchronizing signals for all said video signals, means for inserting said code signals within said horizontal synchronizing signals, means for periodically blanking said video signals to afford a vertical retrace interval, and means for generating coin-demand signals for said program video during a vertical-retrace blanking interval.

11. A subscription television system as recited in claim 10 wherein said means for encoding said frequency-interleaved program video responsive to said code signals includes means for generating a first subcarrier and a second subcarrier having its phase displaced from said first subcarrier but having the same frequency, and means to modulate said program video signals on said first or on said second subcarrier responsive to said code signals.

12. A subscription television system as recited in claim 11 wherein said means for generating horizontal synchronizing signals includes means for providing an unmodulated oscillation at the frequency of said subcarrier during the intervals of said horizontal synchronizing signals.

13. A subscription television system as recited in claim 11 wherein said code signals are binary-code signals and said means for inserting code signals within said horizontal synchronizing signals includes means for inserting an unmodulated oscillation during a portion of said horizontal synchronizing signals having a frequency different from said subcarrier frequency.

14. In a subscription television system, means for generating video signals representative of a marquee, means for generating video signals representative of a program, means for generating audio signals representative of a barker, means for generating audio signals for said program video signals, two separate audio transmission channels, means for transmitting said barker and program audio signals on said two separate audio transmission channels, means for generating audio switching signals, means for interchanging the transmission on said two channels of said barker and program audio signals responsive to said audio switching signals, means for generating video switching signals, means for frequency interleaving said program video signals and said marquee video signals including means for encoding said frequency interleaved program video responsive to said video switching signals, means for generating horizontal synchronizing signals for all said video signals, and means for inserting said audio and video switching signals within said horizontal synchronizing signals.

15. In a subscription television system, means for generating video signals representative of a marquee, means for generating video signals representative of a program, means for generating audio signals representative of a barker, means for generating audio signals for said program video signals, two separate audio transmission channels, means for transmitting said barker and program audio signals on said two audio transmission channels, means for generating audio switching signals, means for interchanging the transmission on said two channels of said barker and program audio signals responsive to said audio switching signals, means for generating video switching signals, means for frequency interleaving said program video signals and said marquee video signals including means for encoding said frequency-interleaved program video responsive to said video switching signals, means for generating horizontal synchronizing signals for all said video signals, means for encoding said audio and video switching signals, means for inserting said encoded switching signals within said horizontal synchronizing signals, means for establishing video blanking intervals to enable vertical retrace to occur, means for generating within said blanking intervals signals representative of the price required to be paid for intelligibly receiving said program video and audio signals and to enable a correlating recording.

16. In a subscription television system as recited in claim 15 wherein said means for encoding said frequency-interleaved program video responsive to said video switching signals includes means for generating a subcarrier having a reference phase, means for deriving therefrom two out-of-phase subcarriers, means to modulate said program video with one or the other of said two out-of-phase subcarriers responsive to said video switching signals.

17. In a subscription television system as recited in claim 16 wherein said audio and video switching code is a binary code, and said means for inserting said code within said horizontal synchronizing signals includes means to establish an interval for each horizontal synchronizing signal, means to fill selected intervals with a burst of said subcarrier having a reference phase to represent one binary-code digit, means to generate oscillations having a frequency different from that of said subcarrier, and means to fill other selected intervals with a burst of said different frequency oscillations followed by a burst of said subcarrier oscillations to represent another binary code digit.

18. In a subscription television system as recited in claim 17 wherein said means for frequency interleaving said program video and marquee video includes means to filter the lower sideband from the output of said means to modulate said program video with one or the other of said two out-of-phase subcarriers, means for separately attenuating said marquee video and the output of said means to filter to prevent overmodulation, and means for adding the output of said separate attenuating means.

19. A television receiver in a television system of the type wherein there are transmitted (1) frequency-interleaved first and second video signals, said second video signals being aperiodically modulated on different phases of a subcarrier used for said frequency interleaving, (2) code signals indicative of the phase of subcarrier employed for said modulation, and (3) bursts of subcarrier at a reference phase and from which said different subcarrier phases are derived, said television receiver having means for receiving all said transmitted signals, means for displaying video signals, means for applying said received first and second video signals to said means for displaying whereby only said first video signals may be seen, means for generating oscillations at said subcarrier frequency, means for maintaining the phase of said generated subcarrier with that of said received subcarrier bursts, means for deriving said different subcarrier phases from said phase-maintained generated subcarrier, means for demodulating said received first and second video signals with a phase of subcarrier selected responsive to said received code signals, and means for applying said demodulated first and second video signals to said means for displaying in place of said received first and second video signals whereby said second video signals may be seen.

20. A television receiver in a television system of the type wherein there are transmitted (1) frequency-interleaved first and second video signals, said second video signals being aperiodically modulated on different phases of a subcarrier used for said frequency interleaving, (2) code signals indicative of the phase of subcarrier employed for said modulation, and (3) bursts of subcarrier at a reference phase and from which said different subcarrier phases are derived, said code signals and subcarrier bursts being transmitted within horizontal-synchronizing-signal intervals, said television receiver having means for receiving all said transmitted signals, means for displaying video signals, means for deriving horizontal-synchronizing signals from said received subcarrier bursts, means for applying said received first and second video signals and said derived horizontal-synchronizing signals to said means for displaying whereby only said first video signals may be seen, means for generating oscillations at said subcarrier frequency, means for maintaining the phase of said generated subcarrier with that of said received subcarrier bursts, means for deriving said different subcarrier phases from said phase-maintained generated subcarrier, means for deriving said code signals from within said horizontal-synchronizing-signal intervals, means for demodulating said received first and second video signals with a phase of subcarrier selected responsive to said code signals, and means for applying said demodulated first and second video signals to said means for displaying in place of said received first and second video signals whereby said second video signals may be seen.

21. A television receiver in a subscription-television system wherein there are transmitted (1) frequency-interleaved barker and program video signals, said program signals being coded by being randomly modulated on different phases of a subcarrier used for said frequency interleaving, (2) code signals indicative of the phase of the subcarrier employed for said modulation, (3) bursts of subcarrier at a reference phase and from which said different subcarrier phases are derived, and (4) signals representative of a coin demand, said television receiver for said signals including means for displaying video signals, means for applying said interleaved barker and program video signals to said means for displaying whereby only said barker video signals may be seen, means for generating oscillations at said subcarrier frequency, means for maintaining the phase of said generated subcarrier with that of said subcarrier bursts, means for deriving said different subcarrier phases from said phase-maintained generated subcarrier, means for demodulating said interleaved barker and program video signals with a phase of subcarrier selected responsive to said code signals, means for establishing a coin demand responsive to said coin-demand signals, means for satisfying said coin demand, and means for applying said demodulated barker and program video signals in place of said barker and program video signals to said means for displaying responsive to output of said means to satisfy said coin demand whereby said program video signals may be seen.

22. A television receiver in a subscription-television system wherein there are transmitted (1) frequency-interleaved barker and program video signals, said program signals being coded by being randomly modulated on different phases of a subcarrier used for said frequency interleaving, (2) first code signals indicative of the phase of the subcarrier employed for said modulation, (3) bursts of subcarrier at a reference phase from which said different subcarrier phases are derived, (4) barker and program audio signals which are randomly being interchanged between two audio transmission channels, (5) second code signals indicative of the interchange, and (6) signals representative of a coin demand, said television receiver for said signals including, means for receiving all said signals, means for displaying video signals, means for applying said barker and program video signals to said means for displaying whereby only said barker video signals may be seen, means responsive to said second code signals to follow only said barker audio signals for reproduction, means for generating oscillations at said subcarrier frequency, means for maintaining the phase of said subcarrier with that of said subcarrier bursts, means for deriving said different subcarrier phases from said phase-maintained generated subcarrier, means for demodulating said interleaved barker and program video signals with a phase of subcarrier selected responsive to said code signals, means for establishing a coin demand responsive to said coin-demand signals, means for satisfying said coin demand, means for applying said demodulated barker and program video signals in place of said barker and program video signals to said means for displaying responsive to output of said means to satisfy said coin demand whereby said program signals are seen, and means to convert said means responsive to said second code signals to follow only said program audio signals for reproduction.

23. A television receiver in a subscription television system where there are transmitted (1) frequency-interleaved marquee and program video signals, said program signals being coded by being randomly modulated on different phases of a subcarrier used for said frequency interleaving, (2) message signals including an identification number and switching signals indicative of the phase of the subcarrier employed for said modulation, (3) bursts of subcarrier at a reference phase and from which said different subcarrier phases are derived, and (4) signals representative of a coin demand, said television receiver for said signals having means for displaying video signals, means for applying said interleaved marquee and program video signals to said means for displaying whereby only said marquee video signals are seen, means for generating oscillations at said subcarrier frequency, means for maintaining the phase of said generated subcarrier with that of said subcarrier bursts, means for deriving said different subcarrier phases from said phase maintained generated subcarrier, means for recognizing an identification number in a message signal, means responsive to recognition by said means to detect the switching signal in said message, means to modulate said interleaved video signals with one of said different subcarrier phases responsive to said detected switching signals, and means for establishing a coin demand responsive to said signals representative of a coin demand, means for satisfying said coin demand, and means responsive to actuation of said satisfying means to apply said subcarrier modulated video instead of said marquee and program video whereby said program video is seen.

24. Apparatus as recited in claim 23 wherein said means for recognizing an identification number in a message includes a drum having a plurality of parallel adjacent tracks on its periphery, a plurality of contact brushes, one for each track positioned adjacent said drum to contact said tracks, a nonconducting card wrapped around the periphery of said drum between said tracks and said brushes, means to rotate said drum in successive angular steps, said card having spaced perforations over said tracks at each step to enable contact of different brush and ring arrangements representative of different identification numbers, and means to store said message signals to enable comparison with the identification number represented by a brush and ring arrangement of said drum.

25. Apparatus as recited in claim 24 wherein said nonconducting card has a recording area, and a marking means associated with said recording area, and means for actuating said marking means to make a mark on said recording area responsive to actuation of said coin-demand-satisfying means.

26. A television receiver in a subscription television system of the type wherein there are transmitted (1) coded program video signals, (2) message signals including video decoding signals and an identification number, (3) identication number selecting signals, and (4) program identifying signals, and coin demand signals, said receiver for said signals having means to identify the number in a message including a drum, having a plurality of parallel conductive tracks around its periphery, a plurality of contact brushes, one for each track positioned adjacent said drum to be in contact therewith, means responsive to said identification number signals to rotate said drum through a predetermined number of angular steps, a code card wrapped around said drum periphery and between said brushes and tracks, said card having openings in a different pattern at each angular step arranged to afford brush and ring contacts in a pattern representative of different identification numbers, and means to compare a message number with the pattern selected by said identification-number-selecting signals; a recording area on said code card, marking means supported adjacent said recording area, means to move said marking means parallel to the axis of said drum a distance determined by said program-identifying signals, means to detect said video-decoding signals responsive to the numbers in the message signals containing both being identified, means to decode said coded program-video signals responsive to said detected decoding signals, means to establish a coin demand responsive to said coin-demand signals, means to satisfy said coin demand, means to move said marking means to make a mark on said recording area responsive to actuation of said coin-demand-satisfying means, video-viewing means, and means to apply said decoded video signals to said viewing means responsive to actuation of said coin-demand-satisfying means.

References Cited in the file of this patent

UNITED STATES PATENTS

| | | |
|---|---|---|
| 2,619,530 | Roschke | Nov. 25, 1952 |
| 2,656,406 | Gray et al. | Oct. 20, 1953 |
| 2,664,460 | Roschke | Dec. 29, 1953 |
| 2,716,151 | Smith | Aug. 23, 1955 |
| 2,731,620 | Gottfried | Jan. 17, 1956 |

OTHER REFERENCES

Electronics for February 1952, pages 96 and 97. Article by R. B. Dome entitled NTSC Color-TV.